(12) United States Patent
Kidosaki et al.

(10) Patent No.: US 11,139,533 B2
(45) Date of Patent: Oct. 5, 2021

(54) POLYOLEFIN MICRO-POROUS FILM, SEPARATOR FILM FOR POWER-STORAGE DEVICE, AND POWER-STORAGE DEVICE

(71) Applicant: UBE INDUSTRIES, LTD., Ube (JP)

(72) Inventors: Toru Kidosaki, Osaka (JP); Ryo Sakimoto, Osaka (JP); Kenji Kawabata, Osaka (JP)

(73) Assignee: Ube Industries, Ltd., Ube (JP)

( * ) Notice: Subject to any disclaimer, the term of this patent is extended or adjusted under 35 U.S.C. 154(b) by 188 days.

(21) Appl. No.: 16/076,248

(22) PCT Filed: Feb. 7, 2017

(86) PCT No.: PCT/JP2017/004356
§ 371 (c)(1),
(2) Date: Aug. 7, 2018

(87) PCT Pub. No.: WO2017/138512
PCT Pub. Date: Aug. 17, 2017

(65) Prior Publication Data
US 2019/0157647 A1    May 23, 2019

(30) Foreign Application Priority Data

Feb. 9, 2016  (JP) .............................. JP2016-022797
Nov. 15, 2016 (JP) .............................. JP2016-222366

(51) Int. Cl.
*H01M 50/411* (2021.01)
*H01M 50/449* (2021.01)
(Continued)

(52) U.S. Cl.
CPC .......... *H01M 50/411* (2021.01); *B32B 7/027* (2019.01); *B32B 27/08* (2013.01); *B32B 27/32* (2013.01);
(Continued)

(58) Field of Classification Search
CPC ............. H01M 2/1653; H01M 2/1686; H01M 10/0525; H01M 2/166; H01M 50/411;
(Continued)

(56) References Cited

U.S. PATENT DOCUMENTS 5,691,077 A * 11/1997 Yu ...................... B01D 67/0027
                                                      429/62
5,922,492 A *  7/1999 Takita .................... B32B 27/32
                                                      429/249

(Continued)

FOREIGN PATENT DOCUMENTS

EP    0682376 A1   11/1995
JP    55-032531 B   8/1980
(Continued)

OTHER PUBLICATIONS

EPO machine generated English translation of JP-2010-265414 (Year: 2010).*

(Continued)

*Primary Examiner* — Christopher P Domone
*Assistant Examiner* — Kimberly Wyluda
(74) *Attorney, Agent, or Firm* — Knobbe Martens Olson & Bear LLP

(57) ABSTRACT

A polyolefin micro-porous film containing a polypropylene resin, in which a meltdown temperature of the polyolefin micro-porous film is 195° C. to 230° C. A weight-average molecular weight of the polypropylene resin is 500,000 to 800,000. Furthermore, a molecular weight distribution of the polypropylene resin is 7.5 to 16.

9 Claims, 3 Drawing Sheets

(51) Int. Cl.
    *H01M 50/491* (2021.01)
    *H01M 50/417* (2021.01)
    *H01M 50/457* (2021.01)
    *H01G 11/52* (2013.01)
    *H01G 11/06* (2013.01)
    *B32B 7/027* (2019.01)
    *B32B 27/08* (2006.01)
    *B32B 27/32* (2006.01)
    *C08J 5/18* (2006.01)
    *H01M 10/0525* (2010.01)
    *H01M 50/446* (2021.01)

(52) U.S. Cl.
    CPC ............... *C08J 5/18* (2013.01); *H01G 11/06* (2013.01); *H01G 11/52* (2013.01); *H01M 10/0525* (2013.01); *H01M 50/449* (2021.01); *B32B 2250/03* (2013.01); *B32B 2250/242* (2013.01); *B32B 2250/40* (2013.01); *B32B 2255/10* (2013.01); *B32B 2255/20* (2013.01); *B32B 2255/26* (2013.01); *B32B 2264/102* (2013.01); *B32B 2307/308* (2013.01); *B32B 2307/516* (2013.01); *B32B 2307/54* (2013.01); *B32B 2307/558* (2013.01); *B32B 2307/734* (2013.01); *B32B 2457/10* (2013.01); *B32B 2457/16* (2013.01); *C08J 2323/12* (2013.01); *H01M 50/417* (2021.01); *H01M 50/446* (2021.01); *H01M 50/457* (2021.01); *H01M 50/491* (2021.01)

(58) Field of Classification Search
    CPC ... H01M 50/449; H01M 50/466; B32B 7/027; B32B 7/08; B32B 7/32; B32B 2250/03; B32B 2250/242; B32B 2250/40; B32B 2264/102; B32B 2307/308; B32B 2307/516; B32B 2307/54; B32B 2307/558; B32B 2307/734; B32B 2457/10; B32B 2457/16; C08J 5/18; C08J 2323/12; H01G 11/06; H01G 11/52
    See application file for complete search history.

(56) References Cited

U.S. PATENT DOCUMENTS

| | | |
|---|---|---|
| 2007/0190303 A1 | 8/2007 | Lee et al. |
| 2011/0027660 A1 | 2/2011 | Takeda et al. |
| 2011/0311856 A1 | 12/2011 | Matsui et al. |
| 2012/0070748 A1 | 3/2012 | Ishihara et al. |
| 2012/0077072 A1 | 3/2012 | Ishihara et al. |
| 2012/0082899 A1 | 4/2012 | Ishihara et al. |
| 2013/0302696 A1 | 11/2013 | Ishihara et al. |
| 2013/0330592 A1 | 12/2013 | Mizuno et al. |
| 2017/0317329 A1* | 11/2017 | Nakadate ............... C08J 7/06 |
| 2018/0294455 A1 | 10/2018 | Sakimoto et al. |

FOREIGN PATENT DOCUMENTS

| | | |
|---|---|---|
| JP | 55-131028 A | 10/1980 |
| JP | 3003830 B | 1/2000 |
| JP | 2000-108249 A | 4/2000 |
| JP | 2010-248518 A | 11/2010 |
| JP | 2010-265414 A | 11/2010 |
| JP | 2010-540691 A | 12/2010 |
| JP | 2011-256316 A | 12/2011 |
| JP | 4830250 B | 12/2011 |
| JP | 2012-138188 A | 7/2012 |
| JP | 2012-530802 A | 12/2012 |
| JP | 5259721 B | 8/2013 |
| JP | 5286817 B | 9/2013 |
| JP | 2013-202944 A | 10/2013 |
| JP | 2014-003038 A | 1/2014 |
| JP | 2014-017275 A | 1/2014 |
| JP | 2014-505339 A | 2/2014 |
| JP | 2014-133839 A | 7/2014 |
| JP | 2015-017249 A | 1/2015 |
| JP | 2015-079749 A | 4/2015 |
| JP | 2015-208894 A | 11/2015 |
| JP | 2015-221889 A | 12/2015 |
| JP | 2016-022678 A | 2/2016 |
| KR | 20080020742 A * | 3/2008 |
| WO | WO 2009/038231 A1 | 3/2009 |
| WO | WO 2010/008003 A1 | 1/2010 |
| WO | WO 2010/147801 A2 | 12/2010 |
| WO | WO 2012/029699 A1 | 3/2012 |
| WO | WO 2012/100049 A1 | 7/2012 |
| WO | WO 2013/058061 A1 | 4/2013 |
| WO | WO 2014/192862 A1 | 12/2014 |
| WO | WO 2017/073781 A1 | 5/2017 |

OTHER PUBLICATIONS

EPO machine generated English translation of KR-20080020742-A (Year: 2008).*
Search report issued in European Patent Application No. 17750234.1, dated Aug. 13, 2019.
Office Action issued in Japanese Patent Application No. 2018-021401, dated Jan. 8, 2019.
International Search Report in International Application No. PCT/JP2017/004356, dated May 16, 2017.
Office Action in Japanese Patent Application No. 2016-222366, dated Sep. 5, 2017.
Office Action issued in Japanese Patent Application No. 2018-021401, dated Sep. 3, 2019.
Office Action in Chinese Patent Application No. 201780007884.5 dated Jun. 8, 2020.

* cited by examiner

POLYOLEFIN MICRO-POROUS FILM, SEPARATOR FILM FOR POWER-STORAGE DEVICE, AND POWER-STORAGE DEVICE

TECHNICAL FIELD

The present invention relates to a polyolefin micro-porous film with excellent heat resistance, a separator film for a power-storage device including the same, and a power-storage device.

Priority is claimed on Japanese Patent Application No. 2016-22797, filed on Feb. 9, 2016, and Japanese Patent Application No. 2016-222366, filed on Nov. 15, 2016, the contents of which are incorporated herein by reference.

BACKGROUND ART

In a power-storage device such as a lithium-ion secondary battery or a lithium-ion capacitor, a separator film made of a polyolefin micro-porous film is interposed between a positive electrode and a negative electrode in order to prevent a short circuit between positive and negative electrodes.

In recent years, as a power-storage device with high energy density, high electromotive force, and low self-discharge, particularly a lithium-ion secondary battery, a lithium-ion capacitor, and the like have been developed and put to practical use.

As the negative electrode of a lithium-ion secondary battery, for example, metal lithium, an alloy of lithium and another metal, an organic material having an ability to adsorb lithium ions or an ability to occlude lithium ions through intercalation, such as carbon or graphite, a conductive polymer material doped with lithium ions, and the like are known. In addition, as the positive electrode, for example, graphite fluoride represented by $(CF_x)_n$, metal oxide such as $MnO_2$, $V_2O_5$, CuO, $Ag_2CrO_4$, or $TiO_2$, sulfide, and chloride are known.

In addition, as a nonaqueous electrolytic solution, a solution obtained by dissolving an electrolyte such as $LiPF_6$, $LiBF_4$, $LiClO_4$, or $LiCF_3SO_3$ in an organic solvent such as ethylene carbonate (EC), propylene carbonate (PC), diethyl carbonate (DEC), dimethyl carbonate (DMC), γ-butyrolactone, acetonitrile, 1,2-dimethoxyethane, or tetrahydrofuran has been used.

However, in the lithium-ion secondary battery, the lithium has particularly strong reactivity, and in a case where an abnormal current flows due to an external short circuit, an erroneous connection, or the like, the battery temperature may significantly rise. Accordingly, there is concern that thermal damage to a device with a battery assembled therein may be caused. In order to avoid such a risk, it has been suggested to use a single-layer or laminated polyolefin micro-porous film as a separator film for a power-storage device such as a lithium-ion secondary battery or lithium-ion capacitor.

When such a single-layer or laminated polyolefin micro-porous film is used as a separator film for a power-storage device, prevention of a short circuit between both electrodes, maintenance of a voltage of a device, and the like can be achieved. In addition, when the internal temperature of the device rises to a predetermined temperature or higher due to an abnormal current or the like, pores of the porous film are blocked and become closed to increase electrical resistance so as not to allow ions to flow between both electrodes. Accordingly, the function of the power-storage device is stopped, and a danger of ignition or the like due to an excessive temperature rise can be prevented, thereby securing safety. The function of preventing a danger of ignition or the like due to an excessive temperature rise is extremely important for a separator film for a power-storage device and is generally called pore closing or shutdown (hereinafter, referred to as SD).

In a case where the polyolefin micro-porous film is used as the separator film for a power-storage device, when a pore closing starting temperature is too low, the flow of ions is impeded by a slight temperature rise in the power-storage device, which results in a problem in practical use. In addition, when the pore closing starting temperature is too high, there is a risk that the flow of ions will not be impeded until ignition or the like occurs, which results in a safety problem. In general, the pore closing starting temperature is considered to be 110° C. to 160° C., and preferably 120° C. to 150° C.

In addition, in a case where the temperature in the power-storage device rises above a pore closing maintenance upper limit temperature, the movement of ions is resumed due to the breakage, and the temperature further rises due to the phenomenon called meltdown (hereinafter, referred to as MD) in which the separator film may be melted and broken. For this reason, as a separator for a power-storage device, it is required not only to have an appropriate non-porosity starting (SD) temperature but also characteristics such that the upper limit (MD) temperature at which non-porosity can be maintained is high. Furthermore, the polyolefin micro-porous film used in the separator film is also required to have, in addition to the characteristics regarding pore closing, low electrical resistance, high mechanical strength such as tensile strength, low variation in thickness unevenness, electrical resistance, and the like.

As a method of producing a single-layer or laminated micro-porous film used in a separator film for a power-storage device, various suggestions have been made. In particular, a method of forming pores can be roughly classified into a wet method and a dry method (see PTLs 1 and 2).

For example, PTL 1 discloses a wet method of producing a micro-porous film. This production method includes a step of forming a film by using a resin mixed with additives and a resin such as PE or PP as a matrix resin for forming a micro-porous film; a step of forming the film into a sheet, extracting the additives from the film formed of the matrix resin and the additives, and forming pores in the matrix resin; and stretching the matrix resin. As the additives, a solvent miscible with the resin, a plasticizer, inorganic fine particles, and the like have been proposed.

In a case of using the wet method as the method of producing a micro-porous film, the viscosity of the resin during extrusion can be reduced by adding additives such as a solvent. Therefore, it is possible to produce a film using a raw material with a high molecular weight as a polymer which is a multi-layer film raw material, and the improvement in mechanical properties such as puncture strength or breaking strength is facilitated. However, in a case of using the wet method, time and effort are necessary for a process of extracting the solvent, and thus it is difficult to improve productivity.

In addition, the pore diameter of the micro-porous film obtained in the wet method is relatively large, and the air permeability tends to be lower than the porosity. Therefore, there is a problem in that dendrites are relatively easily generated when charging or discharging is performed at a high rate as in automobile applications. In addition, in a case of an attempt to improve the SD characteristics, there are also problems such as the deterioration in meltdown characteristics or difficulty in adjustment.

For example, PTL 2 discloses a dry method of producing a micro-porous film. By adopting a setting with a high draft ratio at the time of melt extrusion, the lamellar structure in a film formed into a sheet before stretching is controlled. By uniaxially stretching the film, cleavage is caused at the interface between lamellae such that pores are formed.

In a case of adopting the dry method as the method of producing a micro-porous film, the process of extracting a solvent, which is essential in the wet method, is not needed. Therefore, superior productivity to that in the wet method is achieved. However, the stretching rate is limited, and it is difficult to further improve the productivity.

In order to improve the safety of a battery, heat resistance is required of the separator. In particular, it is known that heat resistance is improved by forming a heat-resistant porous layer by coating a separator film with inorganic particles (PTL 3). However, since additional processing is required, it is more expensive than an unprocessed product.

On the other hand, it is known that heat resistance is imparted by kneading a resin material having a high melting point in polyethylene or polypropylene resin material (PTL 4).

Furthermore, a method of post-processing a heat resin material with high heat resistance by coating (PTL 5), or adhereing porous films made of a resin material having a high melting point which is laminated to a film made of polyethylene or a polypropylene resin material (PTL 6) and the like to improve the heat resistance of the separator film are also known. However, as in the case of forming a heat-resistant porous layer containing inorganic particles as a heat-resistant layer, additional processing is necessary. Therefore, it is more expensive than an unprocessed product.

However, in addition to satisfying market requirements such as electrochemical stability and balance with other physical properties, there are no products that are inexpensive and excellent in heat resistance and excellent in the balance of characteristics as a separator film for a power-storage device.

Furthermore, the separator film for a power-storage device is also required to withstand short circuit defect tests performed after assembly in a battery. PTL 7 describes a pressure resistance failure test, performed immediately after manufacture of a battery, in which, when a voltage of 0.3 kV is applied between battery terminals for 0.5 seconds, a current flow of 0.5 mA or more is regarded as a failure. Particularly, in batteries for in-vehicle use, as the capacity of the device increases, the area of the separator film used for one cell increases. Therefore, if there is a defect such as a short circuit at the voltage even in one point in the separator film used for one cell, the yield in the manufacturing process of the battery drops, which is inconvenient.

CITATION LIST

Patent Literature

[PTL 1] Japanese Unexamined Patent Application, First Publication No. S55-131028
[PTL 2] Japanese Examined Patent Application, Second Publication No. S55-32531
[PTL 3] Japanese Patent No. 5259721
[PTL 4] Published Japanese Translation No. 2012-530802 of the PCT International Publication
[PTL 5] Japanese Patent No. 5286817
[PTL 6] Japanese Unexamined Patent Application, First Publication No. 2000-108249
[PTL 7] Japanese Patent No. 4830250

SUMMARY OF INVENTION

Technical Problem

In recent years, a power-storage device for automotive applications has been put to practical use, has increased in capacity and rate, and lower cost has been achieved.

On the other hand, there is also a high demand for safety, and improvement of safety is required also for the separator film for a power-storage device.

The present inventor has made an attempt to solve the above problems and has an object to provide a polyolefin micro-porous film excellent in safety, a separator film for a power-storage device having the same, and a power-storage device.

Solution to Problem

The present inventors, after conducting intensive studies to solve the above-mentioned problems, found a means capable of solving the problem, thus realizing the present invention. That is, the present invention includes the following [1] to [10].

[1] A polyolefin micro-porous film including a polypropylene resin, in which a meltdown temperature of the polyolefin micro-porous film is 195° C. to 230° C.

[2] The polyolefin micro-porous film according to [1], in which a weight-average molecular weight of the polypropylene resin is 500,000 to 800,000; wherein, the weight-average molecular weight is a value in terms of polystyrene obtained by gel permeation chromatography (GPC).

[3] The polyolefin micro-porous film according to [2], in which a molecular weight distribution of the polypropylene resin is 7.5 to 16.

[4] The polyolefin micro-porous film according to any one of [1] to [3], in which a zero shear viscosity of the polypropylene resin under a condition of 200° C. is 13,000 to 20,000 Pa·s.

[5] The polyolefin micro-porous film according to any one of [1] to [4], further including a polyethylene resin.

[6] The polyolefin micro-porous film according to [5], in which the polyolefin micro-porous film has a laminated structure in which an intermediate layer is formed of the polyethylene resin and a surface layer is formed of the polypropylene resin.

[7] The polyolefin micro-porous film according to any one of [1] to [6], in which a withstand voltage per unit area is 3 kV/m$^2$ or more, wherein, the withstand voltage per unit area is a value obtained by measuring a voltage not enough to conduct in a short circuit test by applying the voltage to a test piece having a size of 10 cm×100 cm.

[8] A separator film for a power-storage device including the polyolefin micro-porous film according to any one of [1] to [7].

[9] The separator film for a power-storage device according to [8], in which a heat-resistant porous layer is laminated on one side or both sides of the polyolefin micro-porous film, the heat-resistant porous layer includes heat-resistant fine particles and an organic binder, a content of the heat-resistant fine particles is in a range of 80 wt % to 99 wt % with respect to the heat-resistant porous layer, and a thickness of the heat-resistant porous layer is in a range of 2 μm to 10 μm.

[10] A power-storage device including the separator film for a power-storage device according to [8] or [9], a positive electrode, and a negative electrode.

Advantageous Effects of Invention

The polyolefin micro-porous film of the present invention is excellent in heat resistance. By using the separator film for a power-storage device including the polyolefin micro-porous film of the present invention, it is possible to contribute to improving the safety of the power-storage device.

DESCRIPTION OF EMBODIMENTS

Figure 1:
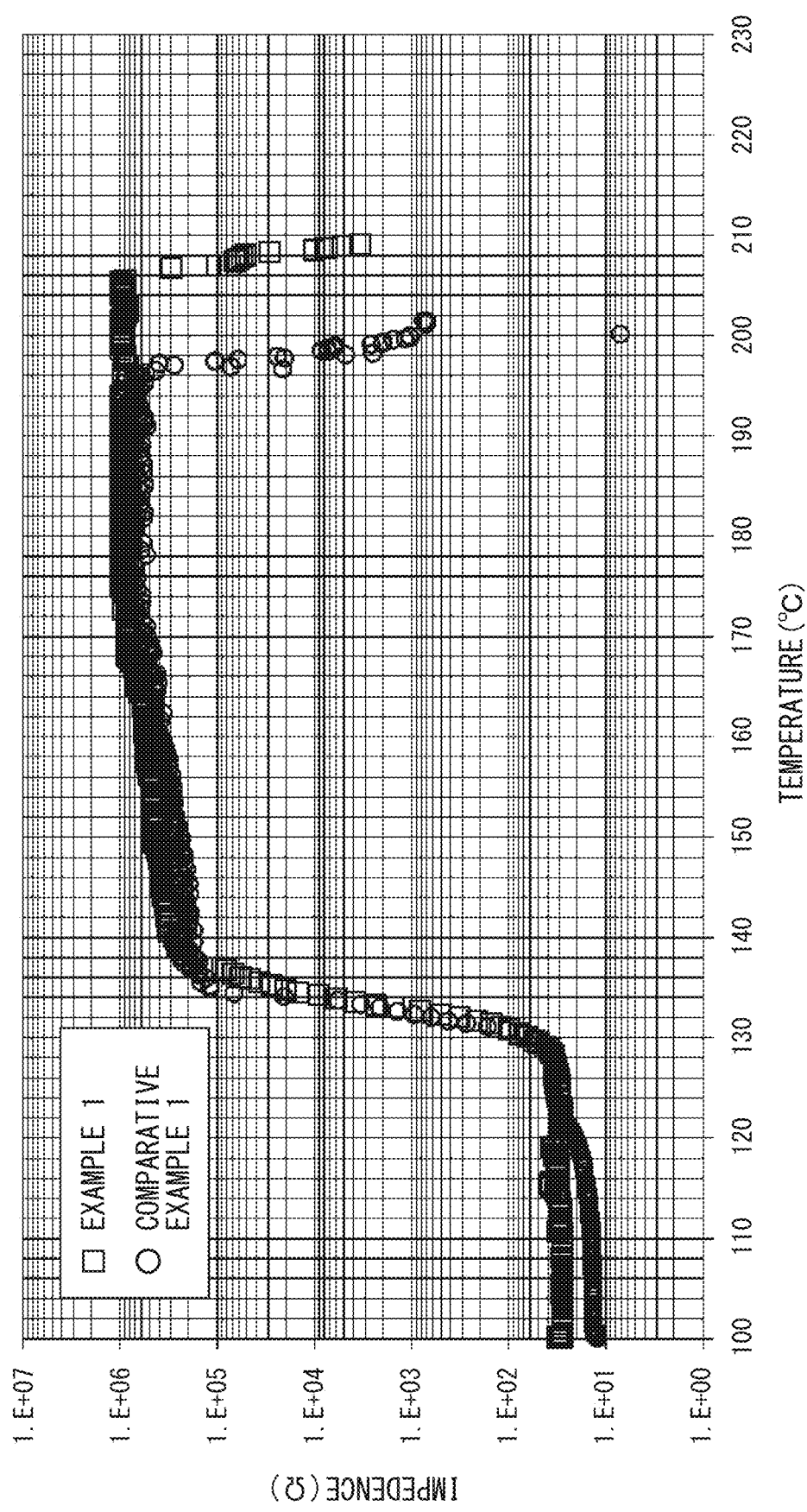
FIG. 1 is a shutdown curve of a polyolefin micro-porous film produced in Example 1 and Comparative Example 1.

Hereinafter, embodiments of the present invention will be described. However, the present invention is not limited thereto, and can be appropriately changed within a range that achieves the effects of the present invention.

The present inventor has found that by using a polypropylene resin in an appropriate range of weight-average molecular weight and molecular weight distribution and combining a uniaxial stretching process by a dry method, a micro-porous film excellent in the balance between productivity (cost), heat resistance, and characteristics as a separator film can be obtained. Therefore, it possible to expect both cost and safety of the power-storage device to be compatible.

In addition, according to the polyolefin micro-porous film of the present invention, a surface opening ratio can be lowered as compared with the prior art while maintaining the same porosity as before, and it is possible to suppress the short circuit of the power-storage device, for example.

(Polyolefin Micro-Porous Film)

The polyolefin micro-porous film of the present invention includes polypropylene (hereinafter, referred to as PP in some cases) resin. The weight-average molecular weight of the polypropylene resin is preferably 500,000 or more, more preferably 540,000 or more, and most preferably 550,000 or more. In addition, the upper limit thereof is preferably 800,000 or less, more preferably 750,000 or less, and most preferably 700,000 or less.

When the weight-average molecular weight in terms of polystyrene as measured by GPC is less than 500,000, mechanical characteristics and meltdown temperature decrease, which is not preferable. In addition, if the weight-average molecular weight exceeds 800,000, the workability of the film deteriorates and the cost of the separator film increases, which is not preferable.

Further, the molecular weight distribution is preferably 7.5 or more, more preferably 8.0 or more, even more preferably 8.5 or more, and most preferably 9.0 or more. The upper limit thereof is preferably 16 or less, more preferably 15 or less, even more preferably 14 or less, and most preferably 13 or less.

When the molecular weight distribution is small, viscosity characteristics are deteriorated and the meltdown temperature is lowered, which is not preferable. If the molecular weight distribution is too large, the workability deteriorates and the cost increases, which is not preferable.

The weight-average molecular weight is a value in terms of polystyrene determined by gel permeation chromatography (GPC). In addition, the molecular weight distribution is a value calculated by using the weight-average molecular weight determined by this method.

Furthermore, the crystal melting peak temperature (melting point) measured by a differential scanning calorimeter (DSC) of the PP resin is preferably 155° C. or higher, more preferably 157° C. or higher, even more preferably 159° C. or higher, and most preferably 160° C. or higher. The upper limit is preferably 175° C. or lower, more preferably 173° C. or lower, even more preferably 170° C. or lower, and most preferably 169° C. or lower. If the crystal melting peak temperature of the PP resin is too low, processing properties of the micro-porous film are deteriorated, which is not preferable.

The zero shear viscosity of the PP resin under the condition of the temperature 200° C. is preferably in the range of 13,000 to 20,000 Pa·s. By setting the zero shear viscosity at 13,000 Pa·s or more, it is possible to set the meltdown temperature of the polyolefin micro-porous film higher than at least 200° C. By setting the zero shear viscosity at 20,000 Pa·s or less, the property of holding the shape can be sufficiently improved as compared with the conventional property, and the shape of the separator can be reliably and stably maintained even under an environment of 200° C. or higher. The zero shear viscosity of the PP resin is more preferably 14,000 to 19,000 Pa·s, and even more preferably 15,000 to 18,000 Pa·s.

The PP resin is a polymer containing propylene as a main component of the monomer as a main component of the monomer in an amount of 80% or more. Such a polymer may be used singly or a plurality of kinds may be mixed. In addition, additives such as a surfactant, an antiaging agent, a plasticizer, a flame retardant, or a colorant are generally included in a PP resin, and also in the PP resin of the present invention, these additives may be contained.

It is preferable that PP resin have high tacticity. A pentad fraction of the PP resin is preferably 80% or more, and more preferably 90% or more.

The polyolefin micro-porous film of the present invention has a meltdown (MD) temperature of 195° C. or higher, preferably 200° C. or higher, more preferably 200.1° C. or higher, and most preferably 201.0° C. or higher. Regarding the upper limit, the higher the temperature, the more preferable, but usually it is 230° C. or lower, preferably 225° C. or lower, or 220° C. or lower is also preferable.

The content of the polypropylene resin in the polyolefin micro-porous film of one embodiment of the present invention may be 90 wt % or more based on the total weight of the polyolefin micro-porous film. It may be 95 wt % or more, or 99 wt % or more. Most preferably, the material of the polyolefin micro-porous film is a polypropylene resin.

The polyolefin micro-porous film according to another embodiment of the present invention may further contain a polyethylene resin.

In that case, the total content of the polypropylene resin and the polyethylene (hereinafter, referred to as PE in some cases) resin in the polyolefin micro-porous film is 90 wt % or more based on the total weight of the polyolefin micro-porous film. It may be 95 wt % or 99 wt % or more. It is most preferable that the material of the polyolefin micro-porous film be a polypropylene resin and a polyethylene resin.

The PE resin is a polymer containing ethylene as a main component of a monomer in an amount of 80% or more. Such a polymer may be used singly or a plurality of kinds may be mixed. In addition, additives such as a surfactant, an antiaging agent, a plasticizer, a flame retardant, or a colorant are generally included in a PE resin, and also in the PP resin of the present invention, these additives may be contained.

The weight-average molecular weight of the PE resin is preferably in a range of 220,000 to 400,000 or less, and more preferably in a range of 300,000 to 400,000.

The molecular weight distribution of the PE resin is preferably in a range of 6.0 to 15.0, and more preferably in a range of 7.5 to 10.0.

The density of the PE resin is preferably in a range of 0.950 g/cm$^3$ to 0.970 g/cm$^3$. The PE resin is preferably a high-density polyethylene having a density of 0.960 g/cm$^3$ or more, but may be medium-density polyethylene.

The melting point of the PE resin is preferably in a range of 125° C. to 140° C., and more preferably in a range of 130° C. to 136° C.

The melting index of the PE resin is preferably in a range of 0.20 to 0.40, and more preferably in a range of 0.30 to 0.40.

The polyolefin micro-porous film of the present invention may be composed of PP resin and PE resin or may be composed only of PP resin. By configuring only with PP resin means to make PP resin as a single layer film.

In addition, the term "configured of the PP resin and the PE resin" means a polyolefin micro-porous film in which PP resin and PE resin are blended by kneading or the like to form a single-layer structure in which the PP resin and the PE resin are laminated. In the case of laminating, a two-layer structure, a three-layer laminated structure, or a laminated structure of four or more layers of PP/PE may be used.

A preferred embodiment is a single-layer film of a PP resin and a film having a three-layer structure. There is a case where the three-layer laminated structure is a laminated structure in which polyethylene is used as an intermediate layer and polypropylene is used as a surface layer, that is, in such a manner that the outer layer is polypropylene and the inner layer is polyethylene (PP/PE/PP), or a case where the outer layer is polyethylene and the inner layer is polypropylene (PE/PP/PE). The laminated structure is not specified in any of the above. However, it does not easily curl, is resistant to external damage, has excellent heat resistance, mechanical strength and the like of the polyolefin micro-porous film, is excellent in safety as a separator for a power-storage device, and from the viewpoint of satisfying characteristics such as reliability and the like, it is most preferable to laminate three layers such that the outer layer is polypropylene and the inner layer is polyethylene (PP/PE/PP).

In the case where the polyolefin micro-porous film is formed by laminating a plurality of polypropylene films or polyethylene films, the PP resin or PE resin configuring each layer may have the same or different molecular weight.

The total thickness of the polyolefin micro-porous film is preferably 7.0 μm or more, more preferably 7.5 μm or more, from the viewpoint of mechanical strength, performance, miniaturization, or the like as a separator for a power-storage device, and further, it is preferably 8.0 μm or more, most preferably 8.5 μm or more. The upper limit thereof is preferably 50 μm or less, more preferably 45 μm or less, and even more preferably 42 μm or less.

If the film thickness is too thin, film breakage tends to occur easily, the short circuit rate of the device increases, and safety may be deteriorated, which is not preferable. In addition, when the film thickness is too thick, safety is improved when used as a separator for a power-storage device. However, it is not preferable because the ion conductivity is lowered and the rate characteristics of the device are deteriorated.

The thickness of the polyolefin micro-porous film can be obtained by analyzing an image of a cross-section of the micro-porous film taken by a scanning electron microscope (SEM), or by a dot type thickness-measuring apparatus or the like.

The air permeability of the polyolefin micro-porous film of each example of the present invention is preferably 80 s/100 cc or more, more preferably 90 s/100 cc or more, even more preferably 100 s/100 cc or more, and most preferably 105 s/100 cc or more. The upper limit is preferably 700 s/100 cc or less, more preferably 650 s/100 cc or less, even more preferably 600 s/100 cc or less, and most preferably 200 s/100 cc or less.

If the air permeability is too low, short circuit tends to occur easily when the battery is operated, which is not preferable. In addition, if the air permeability is too high, since the mobility of ions is lowered and the battery may not operate properly, it is not preferable.

The porosity of the polyolefin micro-porous film of each example of the present invention is preferably 30% or more, more preferably 40% or more, and even more preferably 50% or more. The upper limit is preferably 70% or less, more preferably 60% or less, and even more preferably 58% or less.

If the porosity is too high, the mechanical strength is deteriorated, and since there is a possibility that short circuit tends to occur when the battery is operated, it is not preferable. In addition, if the porosity is too low, since the mobility of ions is lowered and the cell may not operate as a battery, it is not preferable.

The withstand voltage per unit area of the polyolefin micro-porous film of each example of the present invention is preferably 3 kV/m$^2$ or more, more preferably 4 kV/m$^2$ or more, and even more preferably 5 kV/m$^2$ or more. It is most preferably 6 kV/m$^2$ or more.

The withstand voltage per unit area is a value obtained by measuring a voltage not enough to conduct during a short circuit test by applying the voltage to a test piece having a size of 10 cm×100 cm.

That is, the polyolefin micro-porous film of the present invention is preferably a polyolefin micro-porous film which does not conduct voltage in a short circuit test when a voltage of 0.3 kV is applied to a test piece of 10 cm×100 cm.

The higher voltage for inspection is preferable. However, since the voltage depends on the film thickness of the film, the porosity, or the like of the film, it is preferably 0.3 kV, which is the inspection voltage of the battery, more preferably 0.4 kV, more preferably is 0.5 kV, and most preferably 0.6 kV.

Although the total inspection is preferable as the area of inspection, it is preferably 0.10 m$^2$, more preferably 0.15 m$^2$, and most preferably 0.2 m$^2$ from the viewpoint of inspection time and costs.

The maximum pore diameter of the polyolefin micro-porous film is preferably 0.05 μm or more, and more preferably 0.08 μm or more. The upper limit thereof is preferably 2 μm or less, and more preferably 0.5 μm or less.

When the maximum pore diameter is too small, the mobility of ions when used as a separator for a battery is poor and resistance is increased, which is not preferable. In addition, when the maximum pore diameter is too large, the mobility of ions is too high, which is not preferable.

In a case where the polyolefin micro-porous film is a laminate of a plurality of laminated films, the interlaminar peel strength between the films is preferably 3 to 90 g/15 mm, and more preferably 3 to 80 g/15 mm. When the interlaminar peel strength is low, there may be cases where, for example, the film is peeled away during the process of producing the separator for a battery, and curling, elongation, and the like are likely to occur, which causes problems in terms of product quality.

In a case of using the polyolefin micro-porous film as the separator, a uniaxially stretched or biaxially stretched polyolefin micro-porous film is suitable. Among these, the polyolefin micro-porous film uniaxially stretched in the longitudinal direction (MD direction) has a low degree of thermal shrinkage in a width direction while having appropriate strength and is thus particularly preferable. When the uniaxially stretched polyolefin micro-porous film is used as the separator, in a case where the uniaxially stretched polyolefin micro-porous film is wound together with long sheet-like positive and negative electrodes, it is also possible to suppress thermal shrinkage in the longitudinal direction. Therefore, the polyolefin micro-porous film uniaxially stretched in the longitudinal direction is particularly suitable as a separator included in a wound electrode body.

<Method of Producing Polyolefin Micro-Porous Film>

The polyolefin micro-porous film of the present invention is preferably produced by a dry process without using a solvent at the time of production.

Since the solvent component which cannot be removed from the micro-porous film produced by the wet process remains and the melt-down temperature does not improve because it acts as a plasticizer, it is not preferable.

The process for producing the polyolefin micro-porous film described above will be described below.

The polyolefin micro-porous film of the present invention is produced through three processes including a web (precursor film) production process, a lamination process, and a stretching process. The polyolefin micro-porous film can also be produced by producing a raw fabric laminated with three layers using a two-kind three-layer multilayer web-forming device and then subjecting to a drawing process.

In addition, in the case of producing the polyolefin micro-porous film including a single-layer of the PE resin or the PP resin, or in a case of producing a polyolefin micro-porous film using a web formed by a multilayer web film-forming device, a laminate process may be omitted.

[Web Production Process]

The web film, which is a precursor film for producing the polyolefin micro-porous film, preferably has a uniform thickness and has a property of being porous by stretching after laminating a plurality of sheets. Molding by a T-die is preferable as a molding method. However, an inflation method, a wet solution method, or the like may also be adopted.

For example, in a case where melt molding a film is performed separately with a T-die in order to obtain a polyolefin micro-porous film in which the PP resin and the PE resin are laminated, it is generally preferable to melt the film at a temperature of 20° C. to 60° C. at a draft ratio of 10 to 1000, and preferably 50 to 500. In addition, the take-up speed is not particularly limited, and forming is generally performed at 10 m/min to 200 m/min. The take-up speed affects the characteristics of the ultimately obtained polyolefin micro-porous film (the birefringence and elastic recovery ratio affect the pore diameter, porosity, interlaminar peel strength, mechanical strength, and the like of the polyolefin micro-porous film after being stretched) and is thus an important factor.

In addition, in order to suppress the surface roughness of the polyolefin micro-porous film to a predetermined value or lower, the uniformity of the thickness of the web film is important. It is preferable that the coefficient of variation (C.V.) in the thickness of the web be adjusted to a range of 0.001 to 0.030.

[Lamination Process]

A process of laminating a polypropylene film and a polyethylene film that are webs produced in the production process of the web will be described.

The polypropylene film and the polyethylene film are laminated by thermal compression bonding. A plurality of films is performed through thermal compression bonding by passing a laminated film between heated rolls. Specifically, each film is wound from a plurality of sets of web roll stands, and nipped between the heated rolls such that the films are compression-bonded and laminated. In the laminated layer, the thermal compression bonding needs to be performed so as not to substantially decrease the birefringence and the elastic recovery ratio of each film.

The temperature of the rolls heated for thermal compression bonding of a plurality of layers (thermal compression bonding temperature) is preferably 120° C. to 160° C., and more preferably 125° C. to 150° C. When the thermal compression bonding temperature is too low, the peel strength between the films is weak, and peeling occurs in the subsequent stretching process. In contrast, when the thermal compression bonding temperature is too high, polyethylene is melted and the birefringence and elastic recovery ratio of the film are significantly reduced, and thus a satisfactory polyolefin micro-porous film can not be obtained.

In addition, the thickness of the laminated film which is obtained by subjecting the plurality of webs to thermal compression bonding is not particularly limited, and is generally 9 μm to 60 μm.

[Stretching Process]

In the laminated film, the layers are made porous simultaneously in the stretching process.

The stretching process is performed in four zones including a heat treatment zone (oven 1), a cold stretching zone and a hot stretching zone (oven 2), and a heat fixing zone (oven 3).

The laminated film is heat-treated in the heat treatment zone before being stretched. The heat treatment is performed while the laminated film has a fixed length or is pulled under tension so as not to cause the length thereof to increase by 10% or more in a heated air convection oven or a heated roll.

In a case of producing the polyolefin micro-porous film in which the PP resin and the PE resin are laminated, the heat treatment temperature is preferably in a range of 110° C. to 150° C., and more preferably 115° C. to 140° C. When the heat treatment temperature is too low, pore formation is insufficient, and when the temperature is too high, polyethylene is melted. The heat treatment time may be about three seconds to three minutes.

The heat-treated laminated film is stretched in the cold stretching zone. Thereafter, the laminated film passes through the hot stretching zone to become porous, resulting in a laminated micro-porous film. In a case of producing the polyolefin micro-porous film in which the PP resin and the PE resin are laminated, polypropylene and polyethylene cannot become sufficiently porous by only one of the stretching processes, and the characteristics when the laminated micro-porous film (the polyolefin micro-porous film) is used as a separator for a battery deteriorate.

The low-temperature stretching temperature is preferably −20° C. to +50° C., and more preferably 20° C. to 40° C. When the low-temperature stretching temperature is too low, the film is easily broken during operation. On the other hand, when the low-temperature stretching temperature is too high, forming pores becomes insufficient. The low-temperature stretching ratio (initial stretching ratio) is preferably in a range of 3% to 200%, and more preferably in a range of 5% to 100%. When the low-temperature stretching ratio is too low, only a low porosity is obtained. In addition, when the low-temperature stretching ratio is too high, a predetermined porosity and a predetermined pore diameter are not obtained. Accordingly, the above range is preferable.

The low-temperature stretched laminated film is subjected to high-temperature stretching in the hot stretching zone. The high-temperature stretching temperature is preferably 70° C. to 150° C., and more preferably 80° C. to 145° C. When the temperature deviates from this range, it is difficult to achieve sufficient pore formation. The high-temperature stretching ratio (maximum stretching ratio) is in a range of 100% to 400%. When the high-temperature stretching ratio is too low, the air permeability decreases, and when the high-temperature stretching ratio is too high, the air permeability of the laminated micro-porous film becomes too high.

After the low-temperature stretching and the high-temperature stretching, it is preferable that a thermal relaxation process be performed in an oven. The thermal relaxation process is performed for preventing contraction of the film in the stretching direction due to residual stress exerted during the stretching. In the thermal relaxation process, for example, the film is thermally shrunk to such an extent that the film length after stretching decreases in a range of 10% or more and 300% or less in advance to obtain a final stretching ratio. The temperature in the thermal relaxation process is preferably 70° C. to 145° C., and more preferably 80° C. to 140° C.

In a case of producing the polyolefin micro-porous film in which the PP resin and the PE resin are laminated, when the temperature in the thermal relaxation process is too high, the PE layer is melted, which is not preferable. On the other hand, when the temperature in the thermal relaxation process is too low, the thermal relaxation is insufficiently performed, and the thermal shrinkage ratio of the polyolefin micro-porous film increases, it is not preferable. In addition, when the thermal relaxation process is not performed, the thermal shrinkage ratio of the polyolefin micro-porous film increases, which is not preferable in a separator for a power-storage device.

Subsequently, the heat treated-film that has passed through the hot stretching zone is subjected to heat fixing while the dimensions thereof in the hot stretching direction are regulated so as not to change in the heat fixing zone. Heat fixing is performed under tension of constant length (0%) or more, or 10% or less by a heating air circulation oven or heating roll.

The heat fixing temperature is preferably in a range of 110° C. to 150° C., and more preferably in a range of 115° C. to 140° C. When the heat fixing temperature is low, a sufficient heat fixing effect is not obtained, and the thermal shrinkage ratio of the polyolefin micro-porous film increases. In addition, in a case of producing the polyolefin micro-porous film in which the PP resin and the PE resin are laminated, when the heat fixing temperature is too high, polyethylene is melted, which is not preferable.

In the present invention, a web film which is excellent in thickness precision is laminated, and heat fixing is performed after stretching and thermal shrinkage. Therefore, the polyolefin micro-porous film has excellent compression characteristics, excellent dimensional stability, and interlaminar peel strength high enough to satisfy the desired object.

In order to produce the polyolefin micro-porous film, a method of producing the polyolefin micro-porous film may use, as well as the above-described processes in which a plurality of web films are separately produced and laminated into multiple layers, a method in which resins extruded by individual extruders are joined in a die and are simultaneously extruded.

Figure 3:
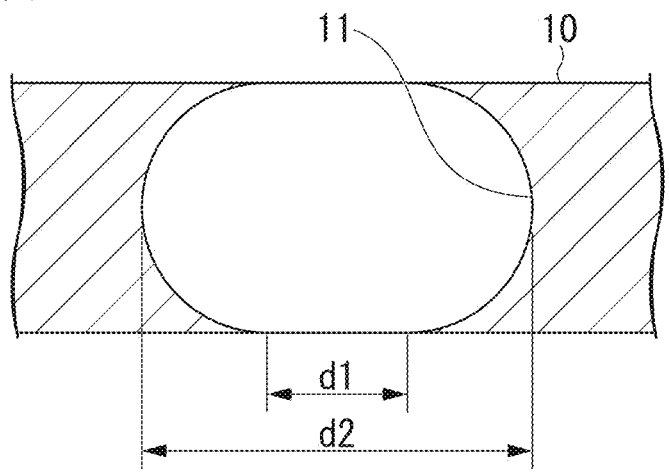
FIG. 3 is a schematic cross-sectional view illustrating an example of the polyolefin micro-porous film of the present embodiment.

FIG. 3 is a schematic cross-sectional view illustrating an example of the polyolefin micro-porous film of the present embodiment. Reference numeral 11 in FIG. 3 denotes one of a large number of pores included in a polyolefin micro-porous film 10. As illustrated in FIG. 3, a pore 11 has a substantially cylindrical shape in which the diameter gradually decreases from the center in the thickness direction toward the front surface and the back surface in cross section. The pores 11 included in the polyolefin micro-porous film 10 have a large difference between a pore diameter d1 and a maximum pore diameter d2 as seen from the surface. Accordingly, in the polyolefin micro-porous film 10 illustrated in FIG. 3, the surface opening ratio is smaller than the porosity.

The polyolefin micro-porous film 10 illustrated in FIG. 3 is a schematic diagram having a porosity of 40 to 70% and surface opening ratio of 10 to 30%. When the porosity is 40% or more and the surface opening ratio is 10% or more, it can sufficiently hold the electrolyte when it is used as a separator of the power-storage device, which is preferable. The porosity is more preferably 50% or more. More preferably, the surface opening ratio is 12% or more.

In addition, when the porosity is 70% or less and the surface opening ratio is 30% or less, it can effectively prevent a short circuit via a separator when used as a separator of a power-storage device, which is preferable. The porosity is more preferably 60% or less. It is further preferable that the surface opening ratio be 25% or less.

Figure 4:
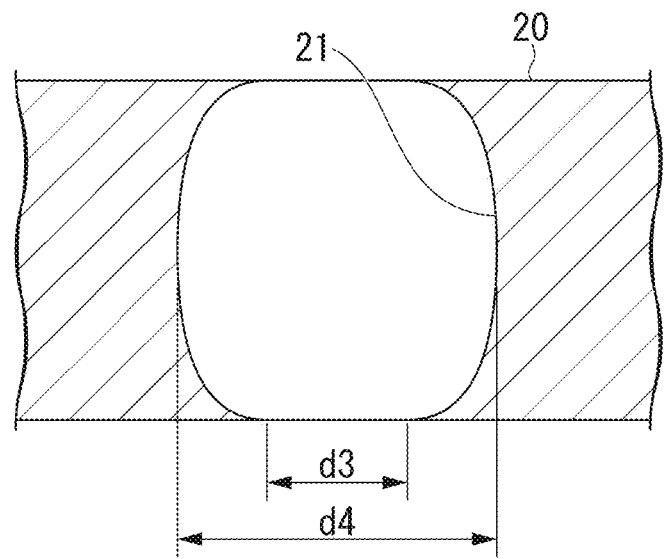
FIG. 4 is a schematic cross-sectional view illustrating a conventional polyolefin micro-porous film.

FIG. 4 is a schematic cross-sectional view illustrating a conventional polyolefin micro-porous film. Reference numeral 21 in FIG. 4 denotes one of a large number of pores included in a polyolefin micro-porous film 20. Similar to the pore 11 illustrated in FIG. 3, the pore 21 illustrated in FIG. 4 has a substantially cylindrical shape in which the diameter gradually decreases from the center in the thickness direction toward the front surface and the back surface in cross section.

However, in a case where the conventional polyolefin micro-porous film 20 illustrated in FIG. 4 is used as a separator of a power-storage device, it can hold the electrolyte sufficiently but cannot effectively prevent a short circuit via a separator.

This is because the difference between the pore diameter d3 and the maximum pore diameter d4 as seen from the surface of the pore 21 illustrated in FIG. 4 is smaller than the pore 11 illustrated in FIG. 3. That is, in the polyolefin micro-porous film 20 illustrated in FIG. 4, when the porosity is such that the electrolyte can be sufficiently retained when used as a separator of the power-storage device, the surface opening ratio becomes too large. Accordingly, it is impossible to sufficiently prevent a short circuit via the separator.

The weight-average molecular weight of the polypropylene resin (PP resin) contained in the polyolefin micro-porous film 10 illustrated in FIG. 3 is preferably 500,000 to 800,000. The lower limit of the weight-average molecular weight is more preferably 540,000 or more, and most preferably 550,000 or more. Furthermore, the upper limit of the weight-average molecular weight is more preferably 750,000 or less, and most preferably 700,000 or less. When the weight-average molecular weight of the PP resin is in the range of 500,000 to 800,000, the polyolefin micro-porous film 10 illustrated in FIG. 3 having the porosity of 40 to 70% and the surface opening ratio of 10 to 30% can be easily manufactured by the production method to be described.

The polyolefin micro-porous film 10 illustrated in FIG. 3 is preferably a single layer film made only of the PP resin or a multilayer film having a surface layer composed of only the PP resin.

Hereinafter, the production method in the case where the polyolefin micro-porous film 10 illustrated in FIG. 3 is made only of the PP resin will be described in detail.

In order to produce the polyolefin micro-porous film 10 made only of the PP resin, it is preferable to use a dry process without using a solvent, similarly to the above-mentioned method for producing the polyolefin micro-porous film. The polyolefin micro-porous film 10 illustrated in FIG. 3 can be produced, for example, through a process of producing a PP web film (precursor film) and a stretching process.

[Production Process of PP Web]

Although a method of producing a web film has already been described, a method of producing the PP web film (hereinafter, referred to as a PP web film) is described below.

The PP web used as the material of the polyolefin micro-porous film 10 illustrated in FIG. 3 can be produced by using known methods and conditions. Specifically, as a method of producing the PP web, a melt molding method using a T-die, an inflation method, a wet solution method, and the like can be included.

In the case of producing the polyolefin micro-porous film 10 illustrated in FIG. 3, it is preferable to produce the PP web by a method of extruding using the T-die by a dry method.

The thickness of the PP web can be determined according to the thickness of the polyolefin micro-porous film 10 to be produced and the magnification of low-temperature stretching and high-temperature stretching described later, but is not particularly limited. In addition, by setting the elastic recovery ratio of the PP web to 90% or less, it becomes possible to enhance the strength of the micro-porous film formed by stretching this web.

A birefringence of the PP web is preferably $15.0 \times 10^{-3}$ to $17.0 \times 10^{-3}$. When the birefringence of the PP web falls within the above range, the polyolefin micro-porous film 10 having the porosity of 40 to 70% and the surface opening ratio of 10 to 30% is easily obtained, which is preferable.

The elastic recovery ratio of the PP web is preferably 90% or less. When the elastic recovery ratio of the PP web is in the above range, the polyolefin micro-porous film 10 having the porosity of 40 to 70% and the surface opening ratio of 10 to 30% is easily obtained, which is preferable. In addition, the strength of the micro-porous film produced using the PP web is high, which is preferable.

[Stretching Process]

Next, the web film unwound from the PP web is uniaxially stretched to be porous.

The stretching process can be performed by a conventionally known method and condition, and can be performed, for example, in the same manner as the above-mentioned method for producing a polyolefin micro-porous film.

Through the above processes, the polyolefin micro-porous film 10 made only of the PP resin having the porosity of 40 to 70% and the surface opening ratio of 10 to 30% is obtained.

Since the polyolefin micro-porous film 10 illustrated in FIG. 3 includes a polypropylene resin and has a meltdown temperature of 195° C. to 230° C., when it is used as a separator of a power-storage device, excellent safety can be obtained. Moreover, the polyolefin micro-porous film 10 illustrated in FIG. 3 has the porosity of 40 to 70% and the surface opening ratio of 10 to 30%. Therefore, when this is used as a separator of the power-storage device, it is possible to sufficiently hold the electrolyte and effectively prevent a short circuit via the separator.

Furthermore, in a case where the polypropylene resin included in the polyolefin micro-porous film 10 illustrated in FIG. 3 has a weight-average molecular weight of 500,000 to 800,000, the polyolefin micro-porous film 10 illustrated in FIG. 3 having the porosity of 40 to 70% and the surface opening ratio of 10 to 30% can easily be produced.

(Separator Film for Power-Storage Device)

The separator film for a power-storage device of the present invention includes the polyolefin micro-porous film of the present invention.

The separator film for a power-storage device according to an embodiment of the present invention can be made of only the polyolefin micro-porous film of the present invention. That is, the polyolefin micro-porous film of the present invention can be used as it is as a separator film for a power-storage device without further processing.

The separator film for a power-storage device according to another embodiment of the present invention may have at least one layer selected from the heat-resistant porous layer, the adhesive layer, and the functional layer on one side or both sides of the polyolefin micro-porous film as the separator film for a power-storage device using the polyolefin micro-porous film of the present invention. The heat-resistant porous layer, the adhesive layer, and the functional layer may be arranged in each single-layer or may be laminated in plural layers.

As a method for forming these layers, they may be laminated by a plurality of coatings, but a layer having a plurality of functions may be arranged by mixing or the like. For example, a well-known method described in PTL 3 can be used.

The heat-resistant porous layer may be applied on one side or both sides of the micro-porous film of the present invention and coating the layer by a method such as a process of mixing heat-resistant fine particles and an organic binder. Furthermore, an organic layer such as a fluorine resin may be coated on the heat-resistant porous layer to produce the adhesive layer. Furthermore, the functional layer may be provided on the adhesive layer by a method that involves mixing the organic fine particles and the binder and applying the mixture.

[Heat-Resistant Porous Layer]

Hereinafter, the heat-resistant porous layer will be described in detail.

The heat-resistant porous layer ensures the heat resistance thereof by containing heat-resistant fine particles. The term "h" means that shape change such as deformation is not visually observed at least at 150° C. The heat resistance of the heat-resistant fine particles is preferably 200° C. or higher, more preferably 300° C. or higher, and even more preferably 400° C. or higher. In addition, the heat-resistant porous layer may be a single-layer or may be a multilayer in which a plurality of layers are laminated.

As the heat-resistant fine particles, inorganic fine particles having electrical insulation properties are preferable. Specifically, fine inorganic oxide particles such as iron oxide, silica ($SiO_2$), alumina ($Al_2O_3$), $TiO_2$, magnesia, boehmite, or $BaTiO_2$; inorganic nitride fine particles such as aluminum nitride and silicon nitride; poorly soluble ionic crystal fine particles such as calcium fluoride, barium fluoride, or barium sulfate; covalent crystal fine particles such as silicon or diamond; and clay fine particles such as montmorillonite can be included. Here, the inorganic oxide fine particles may be fine particles such as substances derived from mineral resources such as boehmite, zeolite, apatite, kaolin, mullite, spinel, olivine and mica, or artificial substances thereof. In addition, inorganic compounds constituting these inorganic fine particles may be elementally substituted or solid solution as necessary. Further, the inorganic fine particles may be subjected to a surface treatment. In addition, the inorganic fine particles are formed by coating the surface of a conductive material exemplified by metal, SnO2, a conductive oxide such as tin-indium oxide (ITO), a carbonaceous material such as carbon black and graphite, (for example, the above-mentioned inorganic oxide or the like) so as to have electric insulation properties.

In addition, organic fine particles may be used as heat-resistant fine particles. Specific examples of the organic fine particles include polyimide, melamine resin, phenol resin, aromatic polyamide resin, crosslinked polymethyl methacrylate (crosslinked PMMA), crosslinked polystyrene (crosslinked PS), polydivinylbenzene (PDVB), benzoguanamine-formaldehyde condensation; fine particles of a crosslinked polymer such as a thermoplastic polyimide; and fine particles of a heat-resistant polymer such as a thermoplastic polyimide. The organic resin (polymer) constituting these organic fine particles can be a mixture, a modified product, a derivative, a copolymer (a random copolymer, an alternating copolymer, a block copolymer, or a graft copolymer), or a crosslinked product (in the case of the above heat-resistant polymer).

As the heat-resistant fine particles, the above-mentioned substance may be used singly or two or more of them may be used in combination.

As the heat-resistant fine particles, inorganic fine particles and organic fine particles can be used as described above, but they may be appropriately used depending on the application.

As the heat-resistant fine particles, boehmite is particularly preferably used. For example, the boehmite having an average particle size of preferably 0.001 μm or more, more preferably 0.1 μm or more, preferably 15 μm or less, and more preferably 3 μm or less is used.

The average particle size of the heat-resistant fine particles can be measured by, for example, using a laser-scattering particle size distribution meter (for example, "LA-920" manufactured by HORIBA) and dispersing the heat-resistant fine particles in a medium in which the heat-resistant fine particles are not dissolved.

The shape of the heat-resistant fine particles may be, for example, a shape close to a spherical shape or a plate shape. From the viewpoint of prevention of short circuit, it is preferable that the heat-resistant fine particles be tabular particles. Representative examples of the plate-like heat-resistant fine particles include alumina and boehmite.

The heat-resistant porous layer contains heat-resistant fine particles as a main component. "Including as the main component" means that the heat-resistant fine particles are contained in an amount of 70 wt % or more in the total volume of the constituent components of the heat-resistant porous layer. The amount of the heat-resistant fine particles in the heat-resistant porous layer is preferably 80 wt % or more, more preferably 85 wt % or more based on the total weight of the constituent components of the heat-resistant porous layer. Heat shrinkage of the entire porous film including the polyolefin micro-porous film can be satisfactorily suppressed by containing the heat-resistant fine particles as the main component in the heat-resistant porous layer.

It is preferably that the heat-resistant porous layer contain an organic binder such as a resin binder in order to bond heat-resistant fine particles containing, for example, as a main component, or bind the heat-resistant fine particles to the polyolefin micro-porous film preferable. From such a viewpoint, a preferable upper limit value of the amount of heat-resistant fine particles in the heat-resistant porous layer is, for example, preferably 99 wt % based on the total weight of constituent components of the heat-resistant porous layer. If the amount of the heat-resistant fine particles in the heat-resistant porous layer is too small, for example, it is necessary to increase the amount of the organic binder in the heat-resistant porous layer. In this case, the pores of the heat-resistant porous layer are filled with the organic binder, and there is a possibility that the function as a separator may be lost, for example. In addition, in a case of making porous by using a pore-forming agent or the like, the space between the heat-resistant fine particles becomes too large and the effect of suppressing heat shrinkage may decrease.

As the organic binder to be used for the heat-resistant porous layer, it is not particularly limited as long as the heat-resistant fine particles, the heat-resistant fine particles, and the polyolefin micro-porous film can be adhered well to each other, it is electrochemically stable, and in a case where it is used as a separator for the power-storage device, it is stable to an electrolytic solution.

For example, an ethylene-vinyl acetate copolymer (EVA, ethylene-vinyl acetate copolymer having 20 to 35 mol % of a structural unit derived from vinyl acetate), an ethylene-acrylic acid copolymer such as an ethylene-ethyl acrylate copolymer, soluble cellulose derivatives such as fluororesin [such as polyvinylidene fluoride (PVDF)], fluorine-containing rubber, styrene-butadiene rubber (SBR), carboxymethyl cellulose (CMC) and hydroxyethyl cellulose (HEC), polyvinyl alcohol (PVA), polyvinyl butyral (PVB), polyvinyl pyrrolidone (PVP), poly N-vinyl acetamide, crosslinked acrylic resin, polyurethane, epoxy resin, polyimide and the like may be used. These organic binders may be used alone, or two or more of them may be used in combination.

Among the above-mentioned organic binders, a heat-resistant resin having a heat resistance of 150° C. or higher is preferable, and in particular, a heat-resistant resin having heat resistance of 150° C. or higher is preferable, and ethylene-vinyl acetate copolymer (EVA), ethylene-acrylic acid copolymer, ethylene-ethyl acrylate copolymer (EEA), polyvinyl butyral (PVB), fluorocarbon rubber, styrene and butadiene rubber (SBR), and the like are more preferable. In addition, a crosslinked acrylic resin having a low glass transition temperature (self-crosslinking acrylic resin) having a structure in which butyl acrylate as a main component is crosslinked is also preferable.

The content of the organic binder in the heat-resistant porous layer is preferably from 1.1 to 30 parts by weight based on 100 parts by weight of the heat-resistant fine particles.

The film thickness of the heat-resistant porous layer is not particularly limited. However, it is preferably 0.5 μm or more, more preferably 1 μm or more, and even more preferably 2 μm or more. The film thickness of the heat-resistant porous layer is preferably 10 μm or less, more preferably 8 μm or less, and even more preferably 6 μm or less. If the heat-resistant porous layer is too thin, the effect of preventing meltdown becomes insufficient. In addition, if the heat-resistant porous layer is too thick, for example, the risk of occurrence of defects such as cracking in the heat-resistant porous layer in the process of incorporating the separator into the battery is increased, which is not preferable. In addition, if the heat-resistant porous layer is too thick, in a case where the heat-resistant porous layer is used as a separator for a power-storage device, the amount of electrolytic solution pouring increases, which contributes to an increase in battery manufacturing cost, and the energy density per unit volume and weight of battery is lowered, which is not preferable.

The total film thickness of the polyolefin micro-porous film and the film thickness of the heat-resistant porous layer is not particularly limited. However, the total film thickness is 4 to 40 μm, preferably 9 to 30 μm, and more preferably 10 to 28 μm. If the above-mentioned film thickness is too thin, the effect of preventing meltdown is insufficient and the effect of suppressing short circuit due to Li dendrite also becomes insufficient, which is not preferable. When the film thickness is too large, when it is used as a battery separator, the amount of electrolytic solution pouring increases, which is one factor in increasing the manufacturing cost of the battery, and the energy density per unit volume and weight of the battery decreases, which is not preferable.

In addition, when the average film thickness of the polyolefin micro-porous film is a (μm) and the average film thickness of the heat-resistant porous layer is b (μm), the value of the film thickness ratio a/b is 0.5 to 20, and more preferably 1 to 10. If the film thickness of the heat-resistant porous layer is increased with respect to the polyolefin micro-porous film, a holding rate of the electrolytic solution is deteriorated. Therefore, the value of the film thickness ratio a/b is preferably in the above range.

The Gurley value (air permeability) of the polyolefin micro-porous film on which the heat-resistant porous layer is laminated is not particularly limited. However, it is 80 to 700 sec/100 cc, preferably 90 to 650 sec/100 cc, and more preferably 100 to 600 sec/100 cc. When the Gurley value is too high, there is a possibility that the function of using the polyolefin micro-porous film laminated with the heat-resistant porous layer as a battery separator may not be sufficiently obtained. When the Gurley value is too low, there is a risk that nonuniformity of reaction inside the battery will be increased, which is not preferable.

[Method for Forming Heat-Resistant Porous Layer]

A method for forming the heat-resistant porous layer includes a process of applying a coating liquid containing the heat-resistant fine particles as a main component on one side or both sides of the polyolefin micro-porous film, and a process of drying the applied coating liquid to form a heat-resistant porous layer.

In a case where the heat-resistant porous layer contains an organic binder, the organic binder may be dissolved in a medium (solvent) of a coating liquid (slurry or the like) for forming the heat-resistant porous layer or may be in the form of an emulsion dispersed in a coating liquid.

This coating liquid contains heat-resistant fine particles and an organic binder in an amount according to necessity, and these are dispersed in a medium such as water or an organic solvent (the organic binder may be dissolved in the medium).

Regarding the organic solvent used as the medium of the coating liquid, the polyolefin micro-porous film should not be dissolved or swollen to damage the polyolefin micro-porous film. In addition, in the case of using the organic binder, the organic binder can be uniformly dissolved as an organic solvent. There are no particular restrictions on the organic solvent as long as it is such a type. However, for example, furans such as tetrahydrofuran (THF); ketones such as methyl ethyl ketone (MEK) or methyl isobutyl ketone (MIBK), and the like are preferable. The organic solvent having a high boiling point is a substance which causes damage such as thermal melting or the like to the polyolefin micro-porous film when coating the polyolefin micro-porous film with the coating liquid for forming the heat-resistant porous layer and then removing the organic solvent by drying or the like. Which is not preferable.

In the case of using these organic solvents, a polyhydric alcohol (ethylene glycol, triethylene glycol or the like) or a surfactant (linear alkylbenzene sulfonate, polyoxyethylene alkyl ether, polyoxyethyl alkyl phenyl ether, or the like) and the like may be appropriately added.

In addition, water can also be used as a medium for the coating liquid. Even in that case, it is also possible to add alcohols (such as alcohols having 6 or less carbon atoms such as ethanol and isopropanol) or surfactants (for example, a substance that can be used as a coating liquid using the organic solvent as a medium) may be added.

As a method of applying the coating liquid on the polyolefin micro-porous film, a common casting or coating method is usually used. Specifically, conventionally known coating apparatuses such as a roll coater, an air knife coater, a blade coater, a rod coater, a bar coater, a comma coater, a gravure coater, a silk screen coater, a die coater, and a micro gravure coater method are used, for example.

Next, the heat-resistant porous layer is formed by drying the coating liquid applied to one side or both sides of the polyolefin micro-porous film to remove the medium in the coating liquid.

Hereinafter, a separator used for a power-storage device such as a lithium-ion secondary battery and a lithium-ion capacitor will be described. The shape of the separator may be appropriately adjusted according to, for example, the shape of the lithium-ion secondary battery. Similarly, the shapes of the positive electrode and the negative electrode may be appropriately adjusted according to the shape of the lithium-ion secondary battery.

The separator is configured of the separator film for a power-storage device of the present embodiment, and has a single layer structure or a multilayer structure.

[Nonaqueous Electrolytic Solution]

As a nonaqueous solvent used in the nonaqueous electrolytic solution to be used in the power-storage device of the present embodiment, a cyclic carbonate and a chain ester are suitably employed. In order to synergistically improve the electrochemical characteristics in a wide temperature range, particularly at a high temperature, it is preferable that the chain ester be contained, it is more preferable that a chain carbonate be contained, and it is most preferable that both the cyclic carbonate and the chain carbonate be contained. The term "chain ester" is used as a concept including the chain carbonate and a chain carboxylic acid ester.

As the cyclic carbonate, one or more selected from ethylene carbonate (EC), propylene carbonate (PC), and vinylene carbonate (VC) can be employed, and a combination of EC and VC, and a combination of PC and VC are particularly preferable.

In addition, when the nonaqueous solvent contains ethylene carbonate and/or propylene carbonate, the stability of the coating formed on the electrode increases and the high-temperature and high-voltage cycle characteristics are improved, which is preferable. The content of ethylene carbonate and/or propylene carbonate is preferably 3 vol % or more, more preferably 5 vol % or more, and even more preferably 7 vol % or more with respect to the total volume of the nonaqueous solvent. In addition, the upper limit thereof is preferably 45 vol % or less, more preferably 35 vol % or less, and even more preferably 25 vol % or less.

As the chain ester, methyl ethyl carbonate (MEC) as an asymmetric chain carbonate, dimethyl carbonate (DMC), diethyl carbonate (DEC) as a symmetric chain carbonate, and ethyl acetate (hereinafter, referred to as EA) as the chain carboxylic acid ester are suitably employed. Among the chain esters, a combination of chain esters which are asymmetric and contain an ethoxy group, such as MEC and EA, is possible.

The content of the chain ester is not particularly limited. The content of the chain ester is preferably used in a range of 60 to 90 vol % with respect to the total volume of the nonaqueous solvent. When the content thereof is 60 vol % or more, the viscosity of the nonaqueous electrolytic solution does not become excessively high, and when the content thereof is 90 vol % or less, there is less concern about a reduction in the electrical conductivity of the nonaqueous electrolytic solution and the deterioration in the electrochemical characteristics in a wide temperature range, particularly at a high temperature. Accordingly, it is preferable that the content be within the above-mentioned range.

Among the chain esters, the proportion of the volume of EA is preferably 1 vol % or more, and more preferably 2 vol % or more in the nonaqueous solvent. The upper limit thereof is more preferably 10 vol % or less, and more preferably 7 vol % or less. The asymmetric chain carbonate preferably has an ethyl group, and is particularly preferably methyl ethyl carbonate.

The ratio between the cyclic carbonate and the chain ester (volume ratio) is preferably 10:90 to 45:55, more preferably 15:85 to 40:60, and particularly preferably 20:80 to 35:65 from the viewpoint of improving the electrochemical characteristics in a wide temperature range, particularly at a high temperature.

[Electrolyte Salt]

As the electrolyte salt to be used in the power-storage device of the present embodiment, a lithium salt is suitably employed.

As the lithium salt, one or more selected from the group consisting of $LiPF_6$, $LiBF_4$, $LiN(SO_2F)_2$, and $LiN(SO_2CF_3)_2$ is preferable, one or more selected from $LiPF_6$, $LiBF_4$, and $LiN(SO_2F)_2$ is more preferable, and $LiPF_6$ is most preferably used.

[Production of Nonaqueous Electrolytic Solution]

The nonaqueous electrolytic solution to be used in the power-storage device of the present embodiment can be obtained by, for example, a method of mixing the nonaqueous solvent and adding thereto the electrolyte salt and a composition obtained by mixing a dissolution aid and the like in specific mixing ratios with respect to the nonaqueous electrolytic solution. At this time, as a compound to be added to the nonaqueous solvent and the nonaqueous electrolytic solution, it is preferable to use those which are purified in advance and thus contain an extremely small amount of impurities in a range in which the productivity is not significantly reduced.

The polyolefin micro-porous film of the present invention can be used in the following first and second power-storage devices, and as the nonaqueous electrolyte, a gelated electrolyte can also be used as well as a liquid electrolyte. Among them, the polyolefin micro-porous film is preferably used as a separator for a lithium-ion battery (first power-storage device) or a lithium-ion capacitor (second power-storage device) in which a lithium salt is used as an electrolyte salt, is more preferably used for a lithium-ion battery, and even more preferably used for a lithium-ion secondary battery.

(Power-Storage Device)

The power-storage device of the present invention includes a positive electrode, a negative electrode, a separator film for a power-storage device including the polyolefin micro-porous film of the present invention as a separator interposed between the positive electrode and the negative electrode, and a nonaqueous electrolytic solution with which the polyolefin micro-porous film is impregnated.

[Lithium-Ion Secondary Battery]

A lithium-ion secondary battery as the power-storage device of the present invention has a positive electrode, a negative electrode, and the nonaqueous electrolytic solution in which the electrolyte salt is dissolved in the nonaqueous solvent. Constituent members such as the positive electrode and the negative electrode other than the nonaqueous electrolytic solution can be used without particular limitations.

For example, as a positive electrode-active material for the lithium-ion secondary battery, a composite lithium metal oxide containing one or more selected from the group consisting of cobalt, manganese, and nickel is used. These positive electrode-active materials can be used singly or in combination of two or more thereof.

As the composite lithium metal oxide, for example, one or more selected from $LiCoO_2$, $LiCo_{1-x}M_xO_2$ (here, M is one or more elements selected from Sn, Mg, Fe, Ti, Al, Zr, Cr, V, Ga, Zn, and Cu), $LiMn_2O_4$, $LiNiO_2$, $LiCo_{1/3}Ni_{1/3}Mn_{1/3}O_2$, $LiNi_{0.5}Mn_{0.3}Co_{0.2}Mn_{0.3}O_2$, $LiNi_{0.8}Mn_{0.1}Co_{0.1}O_2$, $LiNi_{0.8}Co_{0.15}Al_{0.05}O_2$, a solid solution of $Li_2MnO_3$ and $LiMO_2$ (M is a transition metal such as Co, Ni, Mn, or Fe), and $LiNi_{1/2}Mn_{3/2}O_4$ are suitably employed.

The conducting agent of the positive electrode is not particularly limited as long as the conducting agent is made of an electron-conductive material and does not cause a chemical change. For example, graphite such as natural graphite (flake graphite or the like) and artificial graphite, and one or more types of carbon black selected from acetylene black and the like can be employed.

The positive electrode can be produced by applying a positive electrode-active material to aluminum foil of a current collector, a stainless steel plate or the like, drying and pressure molding, and then subjecting it to heat treatment under predetermined conditions.

The positive electrode-active material described above is mixed with the conducting agent such as acetylene black or carbon black and a binder such as polytetrafluoroethylene (PTFE), polyvinylidene fluoride (PVDF), a copolymer of styrene and butadiene (SBR), a copolymer of acrylonitrile and butadiene (NBR), or carboxymethyl cellulose (CMC).

As a negative electrode-active material for the lithium-ion secondary battery, a carbon material capable of occluding or releasing lithium metal or a lithium alloy and lithium, tin (simple substance), a tin compound, silicon (simple substance), a silicon compound, and a lithium titanate compound such as $Li_4Ti_5O_{12}$ can be used singly or in combination of two or more.

Among these, from the viewpoint of capability of occluding and releasing lithium ions, it is more preferable to use a highly crystalline carbon material such as artificial graphite or natural graphite.

In particular, it is preferable to use artificial graphite particles having a lump structure in which a plurality of flat graphite microparticles are aggregated or bonded nonparallel to each other, or particles formed by spheroidizing flake natural graphite by repeatedly applying mechanical action such as compressive force, frictional force, or shear force thereto.

The negative electrode can be produced by a negative electrode mixture obtained by using the negative active material, the same conducting agent, binder, and high-boiling-point solvent as those used in the production of the positive electrode, and kneading the resultant. The obtained negative electrode mixture is applied onto a copper foil or the like of a current collector, is dried and press-formed, and is subjected to a heat treatment under predetermined conditions.

[Lithium-Ion Secondary Battery]

The structure of the lithium-ion secondary battery as one of the power-storage devices of the present invention is not particularly limited. For example, a coin type battery, a cylindrical battery, a prismatic battery, or a laminated battery can be applied.

For example, a wound lithium-ion secondary battery has a configuration in which an electrode body is accommodated in a battery case together with the nonaqueous electrolytic solution. The electrode body is constituted by the positive electrode, the negative electrode, and the separator. The electrode body is impregnated with at least a portion of the nonaqueous electrolytic solution.

In the wound lithium-ion secondary battery, the positive electrode includes a long sheet-like positive electrode current collector, and a positive electrode mixture layer that contains the positive electrode-active material and is provided on the positive electrode current collector. The negative electrode contains a long sheet-like negative electrode current collector, and a negative electrode mixture layer that contains the negative electrode-active material and is provided on the negative electrode current collector.

Like the positive electrode and the negative electrode, the separator is formed in a long sheet shape. The positive electrode and the negative electrode with the separator interposed therebetween are wound in a cylindrical shape.

The battery case includes a cylindrical-bottomed case body and a lid for closing the opening of the case body. The lid and the case body are made of, for example, metal and are insulated from each other. The lid is electrically connected to the positive electrode current collector, and the case body is electrically connected to the negative electrode current collector. The lid may also serve as a positive electrode terminal, and the case body may also serve as a negative electrode terminal.

The lithium-ion secondary battery can be charged and discharged at −40° C. to 100° C., preferably −10° C. to 80° C. In addition, as a measure to increase the internal pressure of the wound lithium-ion secondary battery, a measure to provide a safety valve in the lid of the battery, or a method to provide a cutout in a member of the case body, an airkey, or the like of the battery can also be adopted. In addition, as a safety measure to prevent overcharging, a current interruption mechanism for interrupting current by measuring the internal pressure of the battery may also be provided in the lid.

[Production of Wound Lithium-Ion Secondary Battery]

As an example, a production procedure for the lithium-ion secondary battery will be described below.

First, each of the positive electrode, the negative electrode, and the separator is prepared. Next, these are superimposed and wound in a cylindrical shape to assemble the electrode body. Next, the electrode body is inserted into the case body, and the nonaqueous electrolytic solution is injected into the case body. Accordingly, the electrode body is impregnated with the nonaqueous electrolytic solution. After injecting the nonaqueous electrolytic solution into the case body, the case body is covered with the lid, and the lid and the case body are sealed. The shape of the electrode body after being wound is not limited to the cylindrical shape. For example, after the positive electrode, the separator, and the negative electrode are wound, a pressure may be applied from the side to form a flat electrode body.

The lithium-ion secondary battery can be used as a secondary battery for various applications. For example, the lithium-ion secondary battery can be suitably used as a power source for a driving source such as a motor that is mounted in a vehicle such as an automobile to drive the vehicle. The type of the vehicle is not particularly limited, but examples thereof include a hybrid vehicle, a plug-in hybrid vehicle, an electric vehicle, and a fuel cell vehicle. The lithium-ion secondary battery may be used singly, or a plurality of batteries may be connected in series and/or in parallel so as to be used.

[Lithium-Ion Capacitor]

Another example of the other power-storage device of the present invention is a lithium-ion capacitor. The lithium-ion capacitor includes the separator film for a power-storage device including the polyolefin micro-porous film of the present invention as a separator, a nonaqueous electrolytic solution, a positive electrode, and a negative electrode. The lithium-ion capacitor can store energy using intercalation of lithium ions into a carbon material such as graphite as the negative electrode. As the positive electrode, for example, those using an electric double layer between an activated carbon electrode and the electrolytic solution, those using a doping/dedoping reaction of a π-conjugated polymer electrode, and the like are used. The electrolytic solution contains at least a lithium salt such as $LiPF_6$.

Although the wound lithium-ion secondary battery has been described above, the present invention is not limited thereto, and may also be applied to a laminated lithium-ion secondary battery.

For example, the positive electrode or the negative electrode is sandwiched between a pair of separators and packaged. In this embodiment, the positive electrodes are packaged electrodes. The separators have a size slightly larger than the electrodes. While the bodies of the electrodes are interposed between the pair of separators, tabs extending from the end portions of the electrodes are allowed to protrude outward from the separators. The overlapping side edges of the pair of separators are joined together for packaging, one electrode and the other electrode packaged by the separators are alternately laminated and impregnated with the electrolytic solution, thereby producing a laminated battery. At this time, for a reduction in thickness, the separators and the electrodes may be compressed in the thickness direction.

EXAMPLES

Next, the present invention will be described in more detail with reference to examples, but the present invention is not limited to these examples.
(Evaluation Test Method)
Regarding the polyolefin micro-porous film and the separator film for a power-storage device produced by the method shown below, the following items were evaluated by the following methods for the raw material and the web thereof.

[Peel Strength Measurement]

Test pieces of a width direction (TD): 15 mm×a length direction (MD): 200 mm obtained from the laminated film obtained after the lamination process were taken from the center portion in each of the TD direction and the MD direction (a position 10 mm inward from the end portions is set as the TD direction end surface of the test piece) of the laminated film. For each test piece, a sample in which a part of the adhesive face was peeled off from the A face (one face), and a sample from which part of the adhesive face was peeled off from the B face (the other face) were prepared for each laminated film to prepare a total of 6 samples. The interlaminar peel strength in the MD direction was measured by setting each sample to T state using a 100N load cell by a tensile tester RTC-1210A manufactured by ORIENTEC Co., LTD under the conditions of 50 mm of chuck-to-chuck distance, and 50 mm/min of a crosshead speed. After starting peeling, the average value of peel strengths at the time of peeling by 120 mm, 140 mm, 160 mm, 180 mm, and 200 mm was evaluated as the peel strength. In addition, the unit "g/15 mm" described in Table 1 means the peel strength of a sample cut out at 15 mm in the width direction (TD direction).

[Film Thickness Measurement]

Five test pieces having a tape shape over the entire width of MD 50 mm were prepared from the specimen. The five test pieces were stacked and thicknesses were measured at equal intervals using an electric micrometer manufactured by Feinpruf GmbH (Millitron 1240 probe 5 mmϕ (flat surface, needle pressure 0.75 N)) such that the number of measurement points was 25. The value of ⅕ of the measurement value was used as the thickness for each point.

[Coefficient of Variation (C.V.) of Thickness]

The coefficient of variation (C.V.) of the web thickness was obtained by measuring the thickness of test pieces such that measurement points were measured at 25 points in the width direction, at regular intervals, and then dividing the standard deviation thereof $$(\sqrt{\sigma^2}) \quad \text{[Expression 1]}$$

by the arithmetic average $$(\overline{X}). \quad \text{[Expression 2]}$$

The coefficient of variation (C.V.) of the web was evaluated as an indicator of thickness variation in the film width direction.

[Birefringence]

Birefringence is a value measured with a Bell compensator under orthogonal Nicol conditions using a polarization microscope.

[Elastic Recovery Ratio]

The elastic recovery ratio of the PE web was determined according to the following expression (1). A sample (15 mm in width, 2 inches in length) was set in a tensile tester at 25° C. and 65% relative humidity after 50% elongation and the length when it became 0, 50% at a speed of 2 inches/min, elongated for 1 minute, then relaxed at the same rate was measured.

Elastic recovery ratio (%)=[(Length of 50% elongation−Length when the time when the load becomes 0 after 50% elongation)/(Length of 50% elongation−Length before elongation)]×100     (1)

The elastic recovery ratio of the PP web is as follows (2). A sample (10 mm in width, 50 mm in length) was set in a tensile tester at 25° C. and 65% relative humidity at a load of 0 after 100% elongation, and elongated to 100% at a speed of 50 mm/min. Then, it was relaxed immediately at the same speed, heat-treated at 150° C. for 30 minutes and measured.

Elastic recovery ratio (%)=[(Length of 100% elongation−Length when the time when the load becomes 0 after 100% elongation)/(Length before elongation)]×100     (2)

[Heat Quantity of Fusion]

Using an input compensation type DSC (trade name: Diamond DSC) manufactured by Perkin Elmer, the temperature was raised from 30° C. to 250° C. at a heating rate of 10° C./min in accordance with ISO 3146, after heated scanning, heat treatment was performed for 10 minutes. Thereafter, the temperature was lowered to the lower limit of the scanning temperature at a temperature lowering rate of 10° C./min, the temperature was again scanned to the upper limit of the scanning temperature at a heating rate of 10° C./min, the peak top temperature of the endothermic peak at that time was the melting point, and then heat capacity was taken as heat quality of fusion.

[Weight-Average Molecular Weight and Molecular Weight Distribution]

The weight-average molecular weight and the molecular weight distribution of the PE used as the raw material of the PE web and PP used as the raw material of PP web were determined by standard polystyrene conversion using a V200 type gel permeation chromatograph manufactured by Waters Corporation. Two columns of Shodex AT-G+AT 806 MSs were used for the column and measurement was carried out at 145° C. in orthodichlorobenzene adjusted to 0.3 wt/vol %. As the detector, a differential refractometer (RI) was used.

[Measurement of Air Permeability (Gurley Value)]

A test piece with an entire width of 80 mm in the MD direction was taken from the produced polyolefin microporous film or the separator film for a power-storage device, and measurement was performed on three points including the center portion and the right and left end portions (50 mm inward from the end surfaces) using a B type Gurley densometer (manufactured by Toyo Seiki Co., Ltd.) according to JIS P 8117. The average value of the 3 points was evaluated as a Gurley value.

[Measurement of Tensile Strength and Tensile Elongation]

Measurement was performed according to ASTM D-822.
A strip-shaped test piece extending in the width direction (TD) and having a width of 10 mm and a length of 100 mm and a strip-shaped test piece extending in the longitudinal direction (MD) and having a width of 10 mm and a length of 100 mm were each placed in the width direction (TD) center portion and the left and right end portions (the position 10 mm inside from the end face is the end face in the TD direction of the test piece).

A tensile test was performed using a tensile tester (RTC-1210A by ORIENTEC Co., LTD.) using a load cell of 100

N under the condition that the chuck-to-chuck distance was 50 mm and the crosshead speed was 50 mm/min.

The tensile strength was calculated by the following expression using the load W (kg) at the time of breakage of the test piece and the cross-sectional area S (mm$^2$, the average value of measured film thicknesses was used as the thickness) of the test piece.

$$\text{Tensile Strength(kg/mm}^2) = \frac{W}{S} \quad \text{[Expression 3]}$$

[Tensile Elongation]

The tensile elongation was calculated by the following expression using the gauge length $L_0$ (mm) of the test piece before the test and the gauge distance L (mm) at the time of breakage.

$$\text{Tensile Strength(\%)} = \frac{L - L_0}{L} \times 100 \quad \text{[Expression 4]}$$

The tensile strengths in the MD direction and the TD direction were rounded up or down to a whole integer. In addition, the tensile strengths in the MD direction and the TD direction were rounded up or down to a whole integer.

The average value of the measurement values was evaluated as the tensile strength and the tensile elongation.

[Puncture Strength]

A test piece having a tape shape over the entire length in the TD direction by about 30 mm in the MD direction was taken from the produced polyolefin micro-porous film or separator film for a power-storage device.

A needle test attachment with R=0.5 mm was attached to a handy compression tester manufactured by Kato Tech Co., Ltd. and the load at which the test piece was broken when the center of the fixed test piece was pierced at a speed of 90 mm/min was measured.

Twenty measurements were performed, and the average of the twenty measurements was used as the puncture strength.

[Basis Weight]

Two test pieces of 100 mm×100 mm were taken from both sides in the width direction of the specimen using a mold and the weight of each of the two test pieces taken was measured.

From the measured weight, the basis weight was calculated using the following expression.

$$\text{Basis Weight(g/m}^2) = \frac{\text{(Test piece weight(g)} \times 100 \times 100)}{\text{Test piece area (100 cm}^2)} \quad \text{[Expression 5]}$$

[Porosity]

Two test pieces of 100 mm×100 mm were taken from both end portions in the width direction of the specimen using a mold and the weight of each of the two test pieces taken was measured up to 0.1 mg.

From the measured weight, the porosity was calculated using the following expression. The density in the expression is the density of the sample before porosity. The density of the sample before the porosification was calculated by the following formula assuming that the density of the PP layer in the sample was 0.91 g/cm$^3$ and the density of the PE layer was 0.964 g/cm$^3$.

Density of sample before porosity (g/cm$^3$)=Proportion of PP layer in sample×0.91+(1−Proportion of PP layer in sample)×0.964

$$\text{Porosity(\%)} = \left(1 - \frac{\text{Test piece weight (g)/Density (g/cm}^3)}{\text{Test piece area (100 cm}^2) \times \text{Film thickness (cm)}}\right) \times 100 \quad \text{[Expression 6]}$$

The result was rounded up or down to a whole integer place to the integer.

[Heating Shrinkage Ratio]

Two test pieces (200×200 mm) were taken from the specimen. One test piece was taken so that the position 10 mm inside from one end portion in the width direction was the position of the side of the test piece. The other piece was taken so that the position 10 mm inside from the other end portion in the width direction was the position of the side of the test piece.

A gauge with a gauge distance of 180 mm was marked on the center portion at one point in each of the width direction (TD) and the length direction (MD) of each of the test pieces, and the gauge dimension was measured with a steel scale. The specimen with the marked gauge length was wrapped by paper and was subjected to a heat treatment in a hot air convection type DK-43 manufactured by Yamato Scientific Co., Ltd. at 105° C. for two hours. The specimen subjected to the heat treatment was taken out while being wrapped by the paper, left to cool at room temperature for 60 minutes, and the gauge length was measured with a steel scale. For the two test pieces, the shrinkage rate by heating in the TD direction and MD direction was calculated, and the average value of the two test pieces was taken as the heat shrinkage ratio.

The heating shrinkage ratio was calculated by the following expression using the gauge length before the heating as $L_1$ (mm) and using the gauge length after the heating as $L_2$ (mm).

Heating shrinkage ratio (%)=$(L_1-L_2)/L_1 \times 100$

[Oven Heating Test]

Figure 2A:
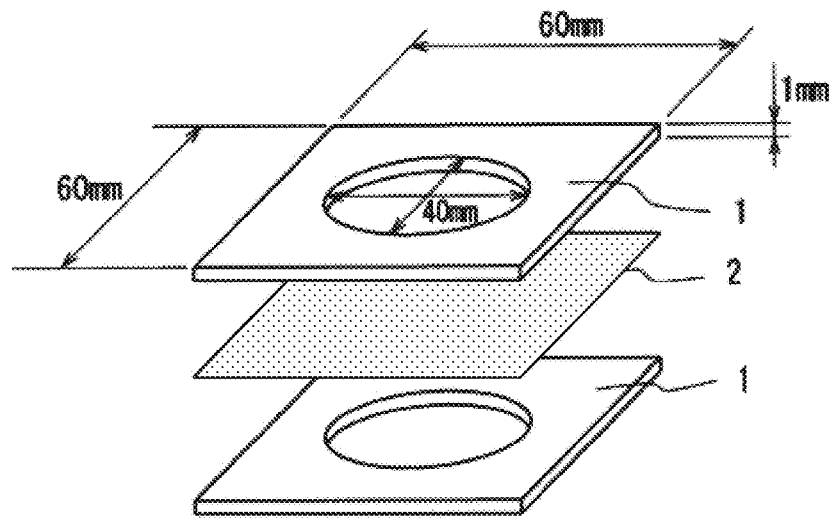
FIG. 2A is a view illustrating a method of fixing a sample at the time of measurement.
Figure 2B:
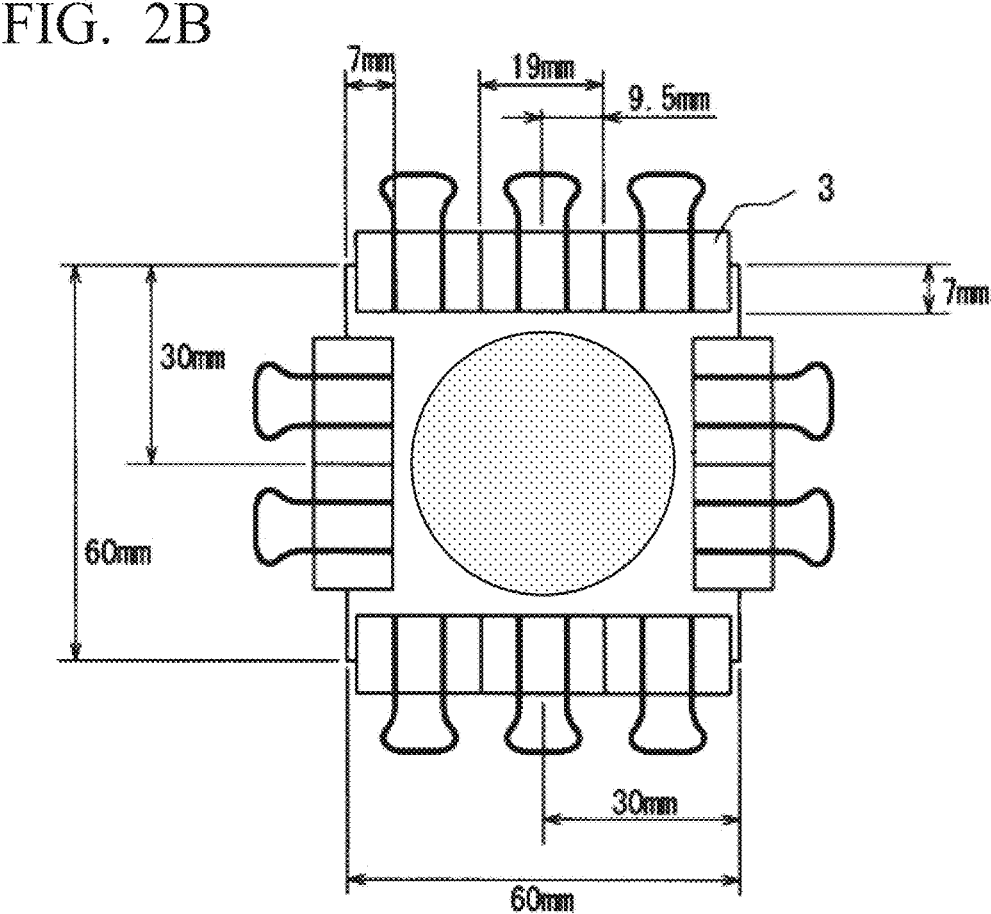
FIG. 2B is a view illustrating a method for fixing a sample at the time of measurement.

As illustrated in FIG. 2A, an aluminum plate 1 (material: JIS standard A 5052, size: longitudinal 60 mm, lateral 60 mm, thickness 60 mm, width: 60 mm) was cut out from a sample 2 cut into 60 mm in length×60 mm in width and circular holes with a diameter of 40 mm at the center 1 mm between the two sheets, and the periphery was fixed with a clip 3 (double clip "Kuri-J35" manufactured by KOKUYO Corporation) as illustrated in FIG. 2B.

Sample 2 in a state fixed with two aluminum plates was placed in an oven (PH-201, damper closed, manufactured by ESPEC Co., Ltd.) set at 200° C., 2 minutes after the oven set temperature reached 200° C. again, the sample was taken out from the oven and the presence or absence of the meltdown (MD) property was evaluated from the state of the sample.

○: When the shape was maintained (there are MD characteristics)

X: When the shape could not be maintained and the membrane was broken (No MD characteristics)

In a case where the film piece cannot be cut into a 60 mm×60 mm square, the sample may be prepared by adjusting so that the film can be installed in a circular hole having a diameter of ϕ40 mm at the center.

[Shutdown and Meltdown Temperature]

The shutdown temperature and meltdown temperature were measured using a self-manufactured electric resistance-measuring cell. A mixed solvent in which propylene carbonate (PC) and diethyl carbonate (DEC) were mixed at a volume ratio of PC/DEC=3/7 was prepared. An electrolytic solution in which lithium hexafluorophosphate was dissolved so as to have a concentration of 1 mol/L with respect to the mixed solvent was impregnated into the manufactured polyolefin micro-porous film or separator film for a power-storage device to prepare a separator sample piece. The separator sample piece impregnated with a nickel electrode impregnated with the electrolytic solution was sandwiched and heated at a rate of 10° C./min. The interelectrode resistance was measured under the conditions of a measurement frequency of 1 kHz using a resistance-measuring device: LCR Hi Tester (manufactured by Hioki Corporation). At this time, the temperature at which the electric resistance reached 1000Ω was taken as the shutdown temperature. In addition, after reaching the shutdown temperature, the temperature was further raised up to 230° C. to confirm if a short circuit occurred, and the temperature at which the short circuit occurred was taken as the meltdown temperature.

[Withstand Voltage Test (Short Circuit Test)]

Using a pinhole test machine TO-5DP model manufactured by Sanko Electronic Laboratories Co., Ltd. under the conditions of an inspection voltage of 0.3 kV and 0.5 kV, an area of a sample size of 10 cm×100 cm was scanned while contacting with a probe, and a withstand voltage test was carried out. Evaluation results are expressed by O and X.
O: There was no energized location.
X: There were 1 or more energized locations.

[Measuring Method of Surface Aperture Ratio]

Surface SEM observation of the polyolefin micro-porous film was carried out, and the image was binarized with Image J. In the image, the opening portion was separated as black and the unopened portion as white, the area of 10 μm×10 μm was analyzed at 4 locations, and the total area of the opening portion was calculated. An average value was calculated from the calculated total area of each opening, divided by the area where the image analysis was performed, and expressed as a percentage.

[Zero Shear Viscosity]

Shear dynamic viscoelasticity measurement of melted PP resin was performed using Rheometer ARES (model: ARES) manufactured by TA Instruments. For the geometry, a cone-parallel plate (cone angle 0.1 rad) was used. Dynamic viscoelasticity measurements were carried out at four temperatures of 220° C., 200° C., 180° C., and 160° C. under the conditions of a frequency range of 400 to 0.01 $s^{-1}$ (5 points per decade) and a strain of 0.1 (10%), and a master curve was prepared based on measurement data at a temperature of 200° C. as a reference. In the region of the frequency of 0.01 $s^{-1}$ or less, the value of the viscosity that became a constant value was taken as the zero shear viscosity. In this specification, the zero shear viscosity calculated based on the above master curve is referred to as a "200° C. condition".

Example 1

Hereinafter, an example of a method of producing the polyolefin micro-porous film of the present invention will be described. For example, in addition to the following method, the polyolefin micro-porous film may also be produced by a coextrusion process using a T-die and a stretching process.

[Production of PP Web]

Using a T-die having a discharge width of 1000 mm and a discharge lip opening of 2 mm, a polypropylene resin having a weight-average molecular weight of 590,000, a molecular weight distribution of 11.0, a pentad fraction of 92%, and a melting point of 161° C. was melted and extruded at a T-die temperature of 200° C. The discharged film was guided to a cooling roll at 90° C. to be cooled by air at 37.2° C. and was then taken up at 40 m/min. The obtained unstretched polypropylene film (PP web) had a film thickness of 14.1 μm, a birefringence of 15.0×10$^{-3}$, and an elastic recovery ratio of 90.0% after a heat treatment at 150° C. for 30 minutes. In addition, the coefficient of variation (C.V.) for the thickness of the web of the obtained PP web was 0.015.

[Production of PE Web]

Using a T-die having a discharge width of 1000 mm and a discharge lip opening of 2 mm, high-density polyethylene having a weight-average molecular weight of 320,000, a molecular weight distribution of 7.8, a density of 0.964 g/cm$^3$, a melting point of 133° C., and a melt index of 0.31 was melted and extruded at 173° C. The discharged film was guided to a cooling roll at 115° C. to be cooled by air at 39° C. and was then taken up at 20 m/min. The obtained unstretched polyethylene film (PE web) had a film thickness of 7.6 μm, a birefringence of 37.5×10$^{-3}$, and an elastic recovery ratio of 38.5% at 50% elongation. In addition, the coefficient of variation (C.V.) for the thickness of the web of the obtained PE web was 0.016.

[Lamination Process]

Using the unstretched PP web (PP web) and the unstretched PE web (PE web), a three-layer laminated film having a sandwich configuration with PE as the inner layer and PP as both outer layers was produced in the following manner.

From three sets of web roll sandwiches, the PP web and the PE web were unwound at a winding speed of 6.5 m/min, were guided to a heating roll, and were subjected to thermal compression bonding by a roll at a roll temperature of 147° C. Thereafter, the resultants were guided to a cooling roll at 30° C. at the same speed and then wound up. The unwinding tension was 5.0 kg for the PP web and was 3.0 kg for the PE web. The obtained laminated film had a film thickness of 35.8 μm and a peel strength of 57.9 g/15 mm.

[Stretching Process]

The three-layer laminated film was guided to a hot air convection oven (heat treatment zone: oven 1) heated to 125° C. and was subjected to a heat treatment. The heat-treated laminated film was then stretched at a low temperature by 18% (initial stretching ratio) between nip rolls maintained at 35° C. in a cold stretching zone. The roll speed on the supply side was 2.8 m/min. Subsequently, hot stretching was performed thereon between rollers in the hot stretching zone (oven 2) heated to 130° C. using the difference between the roll circumferential speeds until 190% (maximum stretching ratio) was achieved. Thereafter, the resultant was subsequently subjected to thermal relaxation to 125% (final stretching ratio) and was then subjected to heat fixing at 133° C. in the heat fixing zone (oven 3) to continuously obtain a polyolefin micro-porous film having a three-layer structure PP/PE/PP.

Characteristics of the raw materials used and physical properties of the resulting polyolefin micro-porous film are illustrated in Table 1 and Table 2.

In addition, Table 2 illustrates the electrical characteristics (results of the withstand voltage test) when the polyolefin micro-porous film of Example 1 was used as a separator film for a power-storage device.

In addition, the meltdown (MD) characteristics of the oven heating test are illustrated in Table 3. Shutdown (SD) temperature characteristics are illustrated in FIG. 1.

Example 2 to Example 6

A polyolefin micro-porous film was prepared in the same manner as in Example 1 except that the PP resin raw material and the film thickness of the PP web and the PE web were changed.

Characteristics of raw materials used and physical properties of the resulting polyolefin micro-porous film are illustrated in Table 1 and Table 2. As the PP resin used in Example 2 to Example 6, raw materials having the physical properties described in Table 1 were used.

In addition, Table 2 illustrates the electrical characteristics (results of the withstand voltage test) in the case where the polyolefin micro-porous films of Example 2 to Example 6 were used as a separator film for a power-storage device.

Example 7

A multilayer fabric of three-layer structure (PP/PE/PP) was prepared using a multilayer raw fabric device, and the laminate process was omitted, and the same procedure as in Example 1 was performed.

Characteristics of raw materials used and physical properties of the resulting polyolefin micro-porous film are illustrated in Table 1 and Table 2. The birefringence and the elastic recovery ratio were measured as a multilayer web as it is. In addition, the elastic recovery ratio was measured in the same manner as the PE raw material.

In addition, Table 2 illustrates the electrical characteristics (results of the withstand voltage test) when the polyolefin micro-porous film of Example 7 was used as a separator film for a power-storage device.

Example 8 and Example 9

A PP single layer polyolefin micro-porous film was prepared in the same manner as in Example 1 except that only the PP web was used and the lamination step was omitted.

Characteristics of raw materials used and physical properties of the resulting polyolefin micro-porous film are illustrated in Table 1 and Table 2. As the PP resin used in Examples 8 and Example 9, raw materials having the physical properties described in Table 1 were used.

In addition, Table 2 illustrates the electrical characteristics (results of the withstand voltage test) in the case where the polyolefin micro-porous films of Example 8 and Example 9 were used as a separator film for a power-storage device.

Example 10 to Example 12

Heat-resistant porous layers (filler: boehmite (average particle diameter 2 µm)) of 2 µm, 5 µm, and 8 µm were each coated on one side of the polyolefin micro-porous films of Examples 1 to 3 and dried, and separator films for a power-storage device having a total thickness 32.0 µm, 31.5 µm, and 29.1 µm were prepared.

The weights of the heat-resistant porous layers were 2.72 g/m$^2$, 6.84 g/m$^2$, and 10.96 g/m$^2$, respectively.

The physical properties of the polyolefin micro-porous films of Example 10 to Example 12 (the same as the polyolefin micro-porous films of Example 1 to Example 3) are illustrated in Table 1. The physical properties of the produced separator film for a power-storage device are illustrated in Table 2. In Example 10 to Example 12, a slurry was prepared using heat-resistant fine particles of boehmite as a filler and polyvinylpyrrolidone (PVP) as a resin binder, and the slurry was coated on one side of the polyolefin micro-porous film to form a heat-resistant porous layer.

Comparative Example 1 to Comparative Example 3

As illustrated in Table 1, the PP resin raw material and the thickness of the PP web and the PE web were changed, and as illustrated in Table 1 for the PP resin, except for using the PP resin having a weight-average molecular weight of 470,000 to 510,000, a molecular weight distribution of 5.6 to 7.2 and a melting point of 166 to 167° C., a polyolefin micro-porous film was prepared in the same way as Example 1.

The characteristics of the raw materials used and physical properties and electric properties of the resulting polyolefin micro-porous film are illustrated in Tables 1 and 2.

Comparative Example 4

As illustrated in Table 1, in the same manner as in Example 8, except that a PP resin having a weight-average molecular weight of 410,000, a molecular weight distribution of 9.3 and a melting point of 164° C. was used, a PP single layer polyolefin micro-porous film was prepared.

The characteristics of the raw materials used and physical properties and electric properties of the resulting polyolefin micro-porous film are illustrated in Tables 1 and 2.

TABLE 1

| | Physical properties | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 | Comparative Example 3 | Comparative Example 4 |
|---|---|---|---|---|---|---|---|---|---|---|---|---|---|---|---|---|---|
| PP resin | Weight-average molecular weight (×10⁶) | 0.59 | 0.66 | 0.63 | 0.60 | 0.60 | 0.71 | 0.64 | 0.59 | 0.55 | 0.59 | 0.66 | 0.63 | 0.47 | 0.51 | 0.48 | 0.41 |
| | Molecular weight distribution | 11.0 | 10.9 | 10.8 | 11.2 | 10.7 | 12.8 | 9.7 | 10.8 | 9.2 | 11.0 | 10.9 | 10.8 | 5.6 | 7.2 | 7.1 | 9.3 |
| | Heat quantity of fusion (J/g) | 116 | 110 | 110 | 112 | 113 | 109 | 112 | 115 | 110 | 116 | 110 | 110 | 106 | 102 | 105 | 104 |
| | DSC peak temperature (° C.) | 161 | 163 | 161 | 161 | 162 | 163 | 160 | 162 | 161 | 161 | 163 | 161 | 167 | 166 | 167 | 164 |
| PP web | Film thickness (μm) | 14.1 | 10.9 | 8.0 | 6.2 | 4.0 | 13.4 | — | 19.0 | 10.0 | 14.1 | 10.9 | 8.0 | 14.1 | 8.1 | 6.2 | 30.0 |
| | Double reflection (×10⁻³) | 15.0 | 17.9 | 16.9 | 16.2 | 16.7 | 15.2 | — | 16.8 | 16.5 | 15.0 | 17.9 | 16.9 | 14.5 | 15.3 | 16.3 | — |
| | Elastic recovery ratio (%) | 90.0 | 89.8 | 88.9 | 88.6 | 87.6 | 89.2 | — | 89.4 | 88.4 | 90.0 | 89.8 | 88.9 | 91.8 | 89.7 | 88.8 | 97.0 |
| PE web | Film thickness (μm) | 7.6 | 9.4 | 9.4 | 7.6 | 7.6 | 22.0 | — | — | — | 7.6 | 9.4 | 9.4 | 7.6 | 9.4 | 8.0 | — |
| | Double reflection (×10⁻³) | 37.5 | 35.5 | 35.2 | 35.3 | 35.3 | 36.4 | — | — | — | 37.5 | 35.5 | 35.2 | 37.5 | 36.8 | 35.7 | — |
| | Elastic recovery ratio (%) | 38.5 | 36.5 | 35.5 | 35.1 | 35.1 | 41.2 | — | — | — | 38.5 | 36.5 | 35.5 | 38.5 | 37.5 | 36.4 | — |
| PP/PE/PP multi-layer web | Film thickness (μm) | — | — | — | — | — | — | 10.1 | — | — | — | — | — | — | — | — | — |
| | Double reflection (×10⁻³) | — | — | — | — | — | — | 20.3 | — | — | — | — | — | — | — | — | — |
| | Elastic recovery ratio (%) | — | — | — | — | — | — | 70.0 | — | — | — | — | — | — | — | — | — |
| | Peel strength (g/15 mm) | — | — | — | — | — | — | No peeling | — | — | — | — | — | — | — | — | — |
| Laminated film | Film thickness (μm) | 35.8 | 31.2 | 25.4 | 20.0 | 15.6 | 48.8 | — | — | — | 35.8 | 31.2 | 25.4 | 7.6 | 25.6 | 20.4 | — |
| | Peel strength (g/15 mm) | 57.9 | 45.7 | 53.4 | 51.2 | 53.6 | 55.2 | — | — | — | 57.9 | 45.7 | 53.4 | 61.8 | 67.4 | 66.1 | — |

TABLE 2

| Physical properties | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 | Comparative Example 3 | Comparative Example 4 |
|---|---|---|---|---|---|---|---|---|---|---|---|---|---|---|---|---|
| Film thickness (μm) | 30 | 26.5 | 21.1 | 16.1 | 12.6 | 40.0 | 7.7 | 16.1 | 8.8 | 32.0 | 31.5 | 29.1 | 29.7 | 20.7 | 16.5 | 25.0 |
| Air permeability (s/100 cc) | 359 | 288 | 286 | 222 | 159 | 594 | 106 | 162 | 185 | 361 | 289 | 290 | 361 | 388 | 289 | 135 |
| MD Tensile strength (MPa) | 157 | 169 | 175 | 182 | 163 | 162 | 155 | 162 | 153 | 159 | 171 | 177 | 165 | 178 | 195 | 107 |
| TD Tensile strength (MPa) | 9 | 9 | 9 | 9 | 9 | 9 | 7 | 10 | 15 | 9 | 9 | 9 | 10 | 10 | 10 | 12 |
| MD Tensile elongation (%) | 96 | 71 | 87 | 91 | 90 | 78 | 66 | 101 | 175 | 96 | 66 | 85 | 95 | 98 | 92 | 64 |
| TD Tensile elongation (%) | >110 | >110 | >110 | >110 | >110 | >110 | >110 | >110 | >110 | >110 | >110 | >110 | >110 | >110 | >110 | >110 |
| Puncture strength (gf) | 541 | 485 | 424 | 277 | 192 | 637 | 112 | 244 | 138 | 542 | 489 | 430 | 536 | 459 | 267 | 230 |
| Porosity (%) | 51 | 53 | 50 | 49 | 49 | 47 | 47 | 53 | 37 | — | — | — | 48 | 44 | 44 | 52 |
| MD Heating shrinkage ratio (%) | 6.2 | 4.3 | 5.5 | 6.9 | 6.1 | 4.1 | 7.2 | 3.4 | 6.8 | 0.8 | 0.7 | 0.5 | 5.9 | 5.4 | 4.1 | 2.5 |
| TD Heating shrinkage ratio (%) | −0.2 | −0.2 | −0.2 | −0.1 | −0.1 | −0.2 | −0.1 | −0.1 | −0.2 | 0.0 | 0.0 | 0.0 | −0.2 | −0.2 | −0.2 | −0.1 |
| Meltdown temperature (°C.) | 206.0 | 203.2 | 202.2 | 201.8 | 201.2 | 212.2 | 201.1 | 204.5 | 201.3 | >230.0 | >230.0 | >230.0 | 191.2 | 189.2 | 187.5 | 184.0 |
| 0.3 kV Short circuit test | ○ | ○ | ○ | ○ | ○ | ○ | ○ | ○ | ○ | ○ | ○ | ○ | ○ | ○ | ○ | ○ |
| 0.5 kV Short circuit test | ○ | ○ | ○ | ○ | ○ | ○ | ○ | ○ | ○ | ○ | ○ | ○ | ○ | ○ | ○ | ○ |

TABLE 3

|  | Example 1 | Comparative Example 1 |
|---|---|---|
| MD Properties of oven heating test | ○ | x |

The zero shear viscosity of the PP resin used in Example 1 to Example 12 and Comparative Example 1 to Comparative Example 4 under the condition of 200° C. was measured by the above method. As a result, the zero shear viscosity of the PP resin used in Example 1 to Example 12 under the condition of 200° C. was in the range of 15,849 to 17,783 Pa·s. With respect to this, the zero shear viscosity of the PP resin used in Comparative Example 1 to Comparative Example 4 under the condition of 200° C. was in the range of 6,310 to 7,079 Pa·s, which was lower than those of Example 1 to Example 12.

As illustrated in Table 2, the polyolefin micro-porous film (or a separator film for a power-storage device) of Example 1 to Example 12 had a meltdown temperature of 195° C. or higher, a result of the withstanding voltage test was 0, and it was confirmed that it is suitable as a separator of the power-storage device.

With respect to this, the polyolefin micro-porous films of Comparative Example 1 to Comparative Example 4 had a meltdown temperature of lower than 195° C., in comparison with the polyolefin micro-porous films of Example 1 to Example 12, and safety when used as a separator of the power-storage device was low.

Example A to Example D and Comparative Example 5 and Comparative Example 6

Using the PP resin illustrated in Table 4, in the same manner as in Example 1, a PP web having the film thickness illustrated in Table 4 was prepared. The obtained raw film had a film thickness of 9 to 26 μm.

In the same manner as in Example 1, a stretching process was carried out on the obtained web to obtain the PP single-layer polyolefin micro-porous films of Example A to Example D.

Table 4 illustrates the properties of the raw materials used in Example A to Example D and Comparative Example 5 and Comparative Example 6, and the physical properties and electrical properties (results of the withstand voltage test) of the polyolefin micro-porous film obtained.

TABLE 4

| | Physical properties | Example A | Example B | Example C | Example D | Comparative Example 5 | Comparative Example 6 |
|---|---|---|---|---|---|---|---|
| PP resin | Weight-average molecular weight (×10$^6$) | 0.59 | 0.59 | 0.59 | 0.59 | 0.47 | 0.48 |
| | Molecular weight distribution | 10.8 | 10.8 | 10.8 | 10.8 | 6.1 | 6.9 |
| | Heat quantity of fusion (J/g) | 115 | 115 | 115 | 115 | 107 | 106 |
| | Melting point (° C.) | 162 | 162 | 162 | 162 | 164 | 163 |
| PP web | Film thickness (μm) | 10.6 | 21.6 | 18 | 23.6 | 28.8 | 29.0 |
| | Double reflection (×10$^{-3}$) | 16.6 | 16.9 | 16.7 | 16.6 | 16.1 | 12.2 |
| | Elastic recovery ratio (%) | 89.0 | 90.0 | 89.3 | 90.0 | 91.4 | 92.0 |
| Polyolefin micro-porous film | Film thickness (μm) | 9.3 | 16.5 | 15.7 | 20.9 | 25.8 | 25.0 |
| | Air permeability (s/100 cc) | 110 | 174 | 137 | 200 | 378 | 333 |
| | MD Tensile strength (MPa) | 183 | 184 | 174 | 160 | 185 | 182 |
| | TD Tensile strength (MPa) | 2 | 10 | 8 | 10 | 9 | 10 |
| | MD Tensile elongation (%) | 67 | 96 | 80 | 96 | 82 | 84 |
| | TD Tensile elongation (%) | 110 | >110 | 94 | >110 | >110 | >110 |
| | Puncture strength (gf) | 151 | 270 | 217 | 284 | 464 | — |
| | Porosity (%) | 51 | 50 | 56 | 52 | 46 | 45 |
| | Surface aperture ratio (%) | 15.4 | 15.3 | 15.9 | 15.5 | 14.9 | 14.9 |
| | MD Heating shrinkage ratio (%) | 5.2 | 5 | 5.2 | 6.7 | 7.4 | 7.1 |
| | TD Heating shrinkage ratio (%) | −0.1 | −0.8 | −0.24 | −0.27 | −0.6 | −0.2 |
| | Meltdown temperature (° C.) | 202.1 | 206.2 | 204.6 | 207.2 | 190.2 | 189.1 |
| | 0.3 kV Short circuit test | ○ | ○ | ○ | ○ | ○ | ○ |
| | 0.5 kV Short circuit test | ○ | ○ | ○ | ○ | ○ | ○ |

As illustrated in Table 4, the polyolefin micro-porous films of Example A to Example D had a meltdown temperature of 195° C. to 230° C. and a result of withstanding voltage test of O, and it was confirmed that they are suitable as a separator of a power-storage device.

With respect to this, the polyolefin micro-porous films of Comparative Example 5 and Comparative Example 6 had a meltdown temperature of lower than 195° C. and had low safety when used as a separator for the power-storage device.

The surface opening ratio of the polyolefin micro-porous film of Example 8, Example A to Example D, Comparative Example 5, and Comparative Example 6 was measured by the above method. The results are illustrated in Table 4.

In addition, the surface opening ratio of Example 8 was 17.7%.

REFERENCE SIGNS LIST

1: aluminum board
2: sample
3: clip
10, 20: polyolefin micro-porous film
11, 21: pore

What is claimed is:

1. A polyolefin micro-porous film, comprising:
a polypropylene resin and a polyethylene resin,
wherein the polyolefin micro-porous film has a laminated structure in which an intermediate layer is formed of the polyethylene resin and a surface layer is formed of the polypropylene resin,
a meltdown temperature of the polyolefin micro-porous film is 195° C. to 230° C.,
a zeroshear viscosity of the polypropylene resin under a condition of 200° C. is 13,000 to 20,000 Pa·s,
the melting point of the polyethylene resin is in a range of 125° C. to 140° C., the weight-average molecular weight of the polyethylene resin is in a range of 220,000 to 400.000, and the molecular weight distribution is in a range of 6 to 15,
a surface opening ratio is in the range of 10% to less than 25%,
and a porosity is in the range of 30% to 70%.

2. The polyolefin micro-porous film according to claim 1,
wherein a weight-average molecular weight of the polypropylene resin is 500,000 to 800,000,
wherein, the weight-average molecular weight is a value in terms of polystyrene obtained by gel permeation chromatography (GPC).

3. The polyolefin micro-porous film according to claim 2, wherein a molecular weight distribution of the polypropylene resin is 7.5 to 16.

4. The polyolefin micro-porous film according claim 1,
wherein a withstand voltage per unit area is 3 kV/m$^2$ or more,
wherein, the withstand voltage per unit area is a value obtained by measuring a voltage that is insufficient to conduct in a short circuit test by applying the voltage to a test piece having a size of 10 cm×100 cm.

5. A separator film for a power-storage device, comprising the polyolefin micro-porous film according to claim 1.

6. The separator film for a power-storage device according to claim 5, wherein:
a heat-resistant porous layer is laminated on one side or both sides of the polyolefin micro-porous film;
the heat-resistant porous layer includes heat-resistant fine particles and an organic binder;
a content of the heat-resistant fine particles is in a range of 80 wt % to 99 wt % with respect to the heat-resistant porous layer; and
wherein a thickness of the heat-resistant fine porous layer is in a range of 2 μm to 10 μm.

7. A power-storage device, comprising:
the separator film for a power-storage device according to claim 5;
a positive electrode; and
a negative electrode.

8. A power-storage device, comprising:
the separator film for a power-storage device according to claim 6;
a positive electrode; and
a negative electrode.

9. The polyolefin micro-porous film according to claim 1, wherein withstand voltage per unit area is 5 kV/m$^2$ or more.

* * * * *